US011540304B2

United States Patent
Lee et al.

(10) Patent No.: US 11,540,304 B2
(45) Date of Patent: Dec. 27, 2022

(54) METHOD AND APPARATUS FOR PERFORMING CSI REPORT IN NR V2X

(71) Applicant: LG ELECTRONICS INC., Seoul (KR)

(72) Inventors: Jongyoul Lee, Seoul (KR); Hanbyul Seo, Seoul (KR); Seungmin Lee, Seoul (KR); Youngdae Lee, Seoul (KR); Giwon Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/678,997

(22) Filed: Feb. 23, 2022

(65) Prior Publication Data

US 2022/0183030 A1    Jun. 9, 2022

Related U.S. Application Data

(63) Continuation of application No. PCT/KR2020/008872, filed on Jul. 8, 2020.
(Continued)

(30) Foreign Application Priority Data

Feb. 6, 2020    (KR) .......................... 10-2020-0014286

(51) Int. Cl.
*H04W 72/12*    (2009.01)
*H04W 72/14*    (2009.01)
(Continued)

(52) U.S. Cl.
CPC ... *H04W 72/1263* (2013.01); *H04W 72/1231* (2013.01); *H04W 72/1278* (2013.01);
(Continued)

(58) Field of Classification Search
CPC ......... H04W 72/1263; H04W 72/1231; H04W 72/1278; H04W 72/14; H04W 80/02; H04W 92/18
See application file for complete search history.

(56) References Cited

U.S. PATENT DOCUMENTS 11,317,381 B2 *  4/2022  Li .......................... H04W 80/02
2018/0317123 A1   11/2018  Chen et al.
(Continued)

FOREIGN PATENT DOCUMENTS

KR    10-2017-0081231 A    7/2017
KR    10-2018-0120114 A    11/2018
(Continued)

OTHER PUBLICATIONS

Zte et al., "Discussion on CSI and RSRP report", R2-1914537, 3GPP TSG RAN WG2 Meeting #108, Reno, USA, Nov. 18-22, 2019, see section 2.2.
(Continued)

*Primary Examiner* — Parth Patel
(74) *Attorney, Agent, or Firm* — Dentons US LLP

(57) ABSTRACT

Based on an embodiment of the present disclosure, provided is a method for performing sidelink communication by a first device. The method may comprise: receiving, from a second device, a CSI-RS; transmitting, to a base station, a SR or a BSR, based on triggering of sidelink CSI MAC CE transmission to the second device by channel-related information measured based on the CSI-RS; receiving, from the base station, a sidelink grant related to the SR or the BSR; and canceling the triggered sidelink CSI MAC CE transmission to the second device, based on a latency bound related to the sidelink CSI MAC CE transmission and a time period based on the sidelink grant for the sidelink CSI MAC CE transmission.

17 Claims, 26 Drawing Sheets

Related U.S. Application Data

(60) Provisional application No. 62/976,339, filed on Feb. 13, 2020.

(51) Int. Cl.
*H04W 80/02* (2009.01)
*H04W 92/18* (2009.01)

(52) U.S. Cl.
CPC ............ *H04W 72/14* (2013.01); *H04W 80/02* (2013.01); *H04W 92/18* (2013.01)

(56) References Cited

U.S. PATENT DOCUMENTS

| | | | | |
|---|---|---|---|---|
| 2020/0344771 | A1* | 10/2020 | Kang | H04W 28/0263 |
| 2021/0013948 | A1* | 1/2021 | Agiwal | H04W 52/365 |
| 2021/0136810 | A1* | 5/2021 | Kung | H04W 72/10 |
| 2021/0152226 | A1* | 5/2021 | Baghel | H04W 72/14 |
| 2021/0195613 | A1* | 6/2021 | Agiwal | H04W 72/14 |
| 2021/0274545 | A1* | 9/2021 | Adjakple | H04W 28/0268 |
| 2021/0385842 | A1* | 12/2021 | Zhao | H04L 5/0057 |
| 2022/0007231 | A1* | 1/2022 | Basu Mallick | H04W 72/02 |
| 2022/0077993 | A1* | 3/2022 | Hong | H04B 7/0626 |
| 2022/0131676 | A1* | 4/2022 | Zhang | H04L 5/0085 |
| 2022/0132356 | A1* | 4/2022 | Jung | H04W 24/10 |
| 2022/0132455 | A1* | 4/2022 | Gupta | H04W 60/00 |

FOREIGN PATENT DOCUMENTS

| | | | |
|---|---|---|---|
| WO | WO-2021090248 | A1 * | 5/2021 |
| WO | WO-2021140494 | A1 * | 7/2021 |

OTHER PUBLICATIONS

Interdigital Inc., "RAN2 Aspects of CQI/RI Reporting", R2-1914870, 3GPP RAN WG2 Meeting #108, Reno, USA, Nov. 18-22, 2019, see section 2.

Intel Corporation, "Sidelink physical layer procedures for NR V2X communication", R1-1910653, 3GPP TSG RAN WG1 Meeting #98bis, Chongqing, China, Oct. 14-20, 2019, see sections 2-4.

Vivo, "Discussion on SR and BSR", R2-1914928, 3GPP TSG-RAN WG2 Meeting #108, Reno, USA, Nov. 18-22, 2019, see section 2.

"Sidelink physical layer structure for NR V2X", Huawei, HiSilicon, 3GPP TSG RAN WG1 Meeting #99, Reno, USA, Nov. 18-22, 2019, R1-1911882, 35 pages.

* cited by examiner

● : TX UE
◐ : RX UE

● : TX UE
◎ : RX UE

METHOD AND APPARATUS FOR PERFORMING CSI REPORT IN NR V2X

This application is a Continuation Application of International Application No. PCT/KR2020/008872, filed on Jul. 8, 2020, which claims the benefit of and priority to Korean Application No. 10-2020-0014286, filed on Feb. 6, 2020 and U.S. Provisional Application No. 62/976,339, filed on Feb. 13, 2020, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

The present disclosure provides a method for performing SL communication between devices (or UEs), and device(s) (or UE(s)) performing the method.

The present disclosure provides a method for performing CSI reporting through a CSI MAC CE, and device(s) (or UE(s)) performing the method.

Technical Solutions

Based on an embodiment of the present disclosure, a method for performing sidelink (SL) communication by a first device may be provided. The method may comprise: receiving, from a second device, a channel state information (CSI)-reference signal (RS); transmitting, to a base station, a scheduling request (SR) or a buffer status report (BSR), based on triggering of sidelink CSI medium access control (MAC) control element (CE) transmission to the second device by channel-related information measured based on the CSI-RS; receiving, from the base station, a sidelink grant related to the SR or the BSR; and canceling the triggered sidelink CSI MAC CE transmission to the second device, based on a latency bound related to the sidelink CSI MAC CE transmission and a time period based on the sidelink grant for the sidelink CSI MAC CE transmission.

Based on an embodiment of the present disclosure, a first device configured to perform sidelink (SL) communication may be provided. The first device may comprise: at least one memory storing instructions; at least one transceiver; and at least one processor connected to the at least one memory and the at least one transceiver. The at least one processor may execute the instructions to: receive, from a second device, a channel state information (CSI)-reference signal (RS); transmit, to a base station, a scheduling request (SR) or a buffer status report (BSR), based on triggering of sidelink CSI medium access control (MAC) control element (CE) transmission to the second device by channel-related information measured based on the CSI-RS; receive, from the base station, a sidelink grant related to the SR or the BSR; and cancel the triggered sidelink CSI MAC CE transmission to the second device, based on a latency bound related to the sidelink CSI MAC CE transmission and a time period based on the sidelink grant for the sidelink CSI MAC CE transmission.

Based on an embodiment of the present disclosure, an apparatus (or chip (set)) configured to control a first user equipment (UE) may be provided. The apparatus may comprise: at least one processor; and at least one memory connected to the at least one processor and storing instructions. The at least one processor may execute the instructions to: receive, from a second UE, a channel state information (CSI)-reference signal (RS); transmit, to a base station, a scheduling request (SR) or a buffer status report (BSR), based on triggering of sidelink CSI medium access control (MAC) control element (CE) transmission to the second UE by channel-related information measured based on the CSI-RS; receive, from the base station, a sidelink grant related to the SR or the BSR; and cancel the triggered sidelink CSI MAC CE transmission to the second UE, based on a latency bound related to the sidelink CSI MAC CE transmission and a time period based on the sidelink grant for the sidelink CSI MAC CE transmission.

Based on an embodiment of the present disclosure, a non-transitory computer-readable storage medium storing instructions may be provided. The instructions, when executed, may cause a first device to: receive, from a second device, a channel state information (CSI)-reference signal (RS); transmit, to a base station, a scheduling request (SR) or a buffer status report (BSR), based on triggering of sidelink CSI medium access control (MAC) control element (CE) transmission to the second device by channel-related information measured based on the CSI-RS; receive, from the base station, a sidelink grant related to the SR or the BSR; and cancel the triggered sidelink CSI MAC CE transmission to the second device, based on a latency bound related to the sidelink CSI MAC CE transmission and a time period based on the sidelink grant for the sidelink CSI MAC CE transmission.

Based on an embodiment of the present disclosure, a method for performing wireless communication by a base station may be provided. The method may comprise: receiving, from a first device, a scheduling request (SR) or a buffer status report (BSR), based on triggering of sidelink channel state information (CSI) medium access control (MAC) control element (CE) transmission to a second device by the first device; and transmitting, to the first device, a sidelink grant related to the SR or the BSR, wherein the sidelink CSI MAC CE transmission to the second device is triggered by the first device based on channel-related information measured based on a CSI-reference signal (RS) received by the first device from the second device, and wherein, based on a latency bound related to the sidelink CSI MAC CE transmission and a time period based on the sidelink grant for the sidelink CSI MAC CE transmission, the triggered sidelink CSI MAC CE transmission to the second device is canceled by the first device.

Based on an embodiment of the present disclosure, a base station configured to perform wireless communication may be provided. The base station may comprise: at least one memory storing instructions; at least one transceiver; and at least one processor connected to the at least one memory and the at least one transceiver. The at least one processor may execute the instructions to: receive, from a first device, a scheduling request (SR) or a buffer status report (BSR), based on triggering of sidelink channel state information (CSI) medium access control (MAC) control element (CE) transmission to a second device by the first device; and transmit, to the first device, a sidelink grant related to the SR or the BSR, wherein the sidelink CSI MAC CE transmission to the second device is triggered by the first device based on channel-related information measured based on a CSI-reference signal (RS) received by the first device from the second device, and wherein, based on a latency bound related to the sidelink CSI MAC CE transmission and a time period based on the sidelink grant for the sidelink CSI MAC CE transmission, the triggered sidelink CSI MAC CE transmission to the second device is canceled by the first device.

Effects of the Disclosure

Based on the present disclosure, V2X communication between devices (or UEs) can be efficiently performed.

DESCRIPTION OF EXEMPLARY EMBODIMENTS

Figure 1:
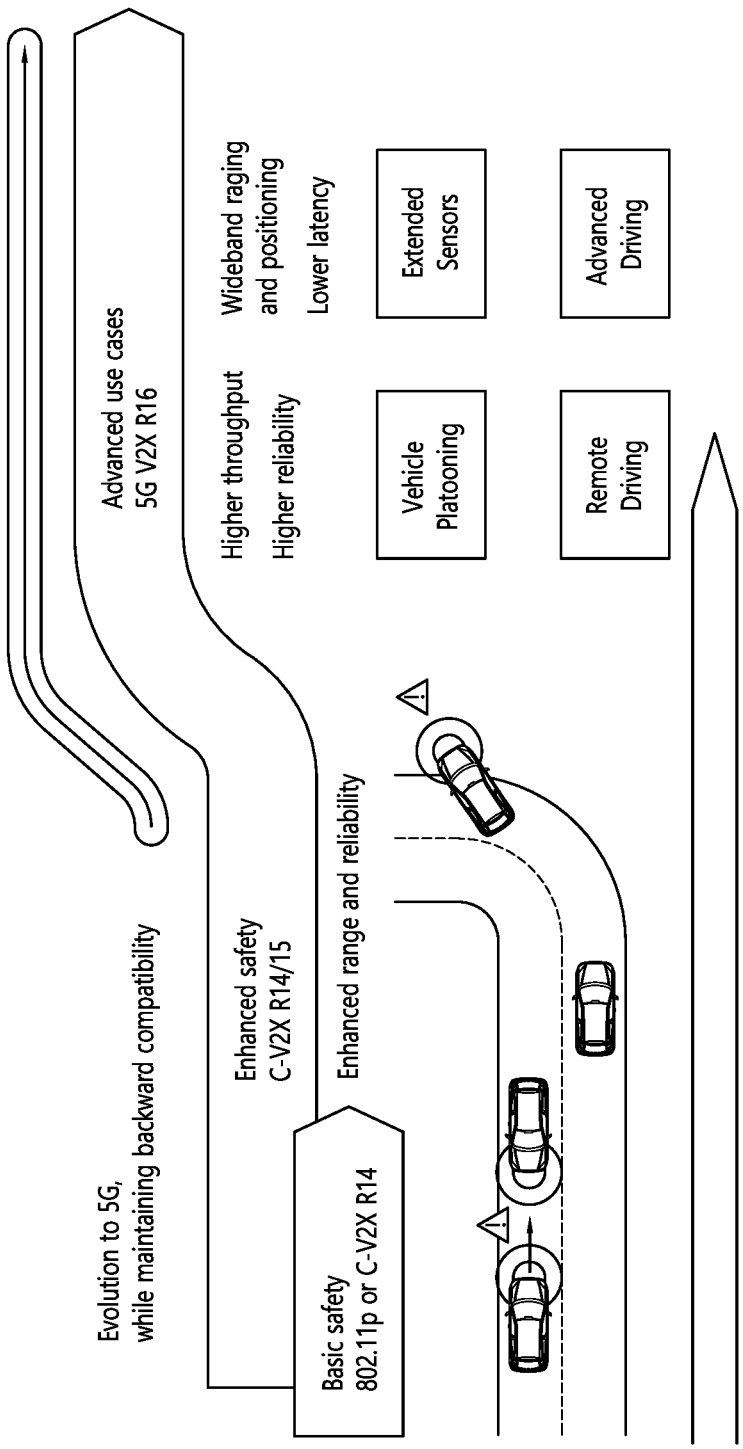
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
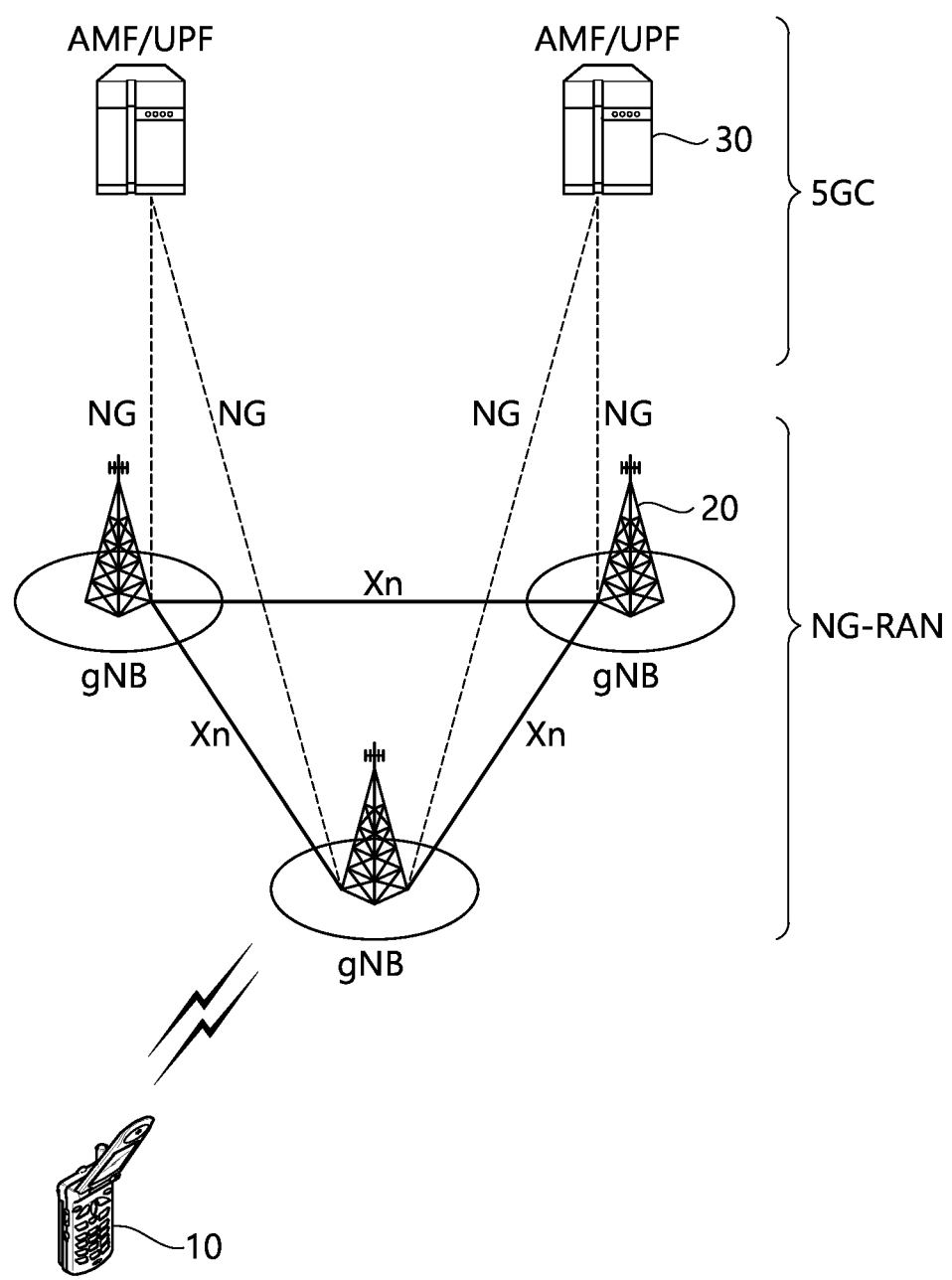
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
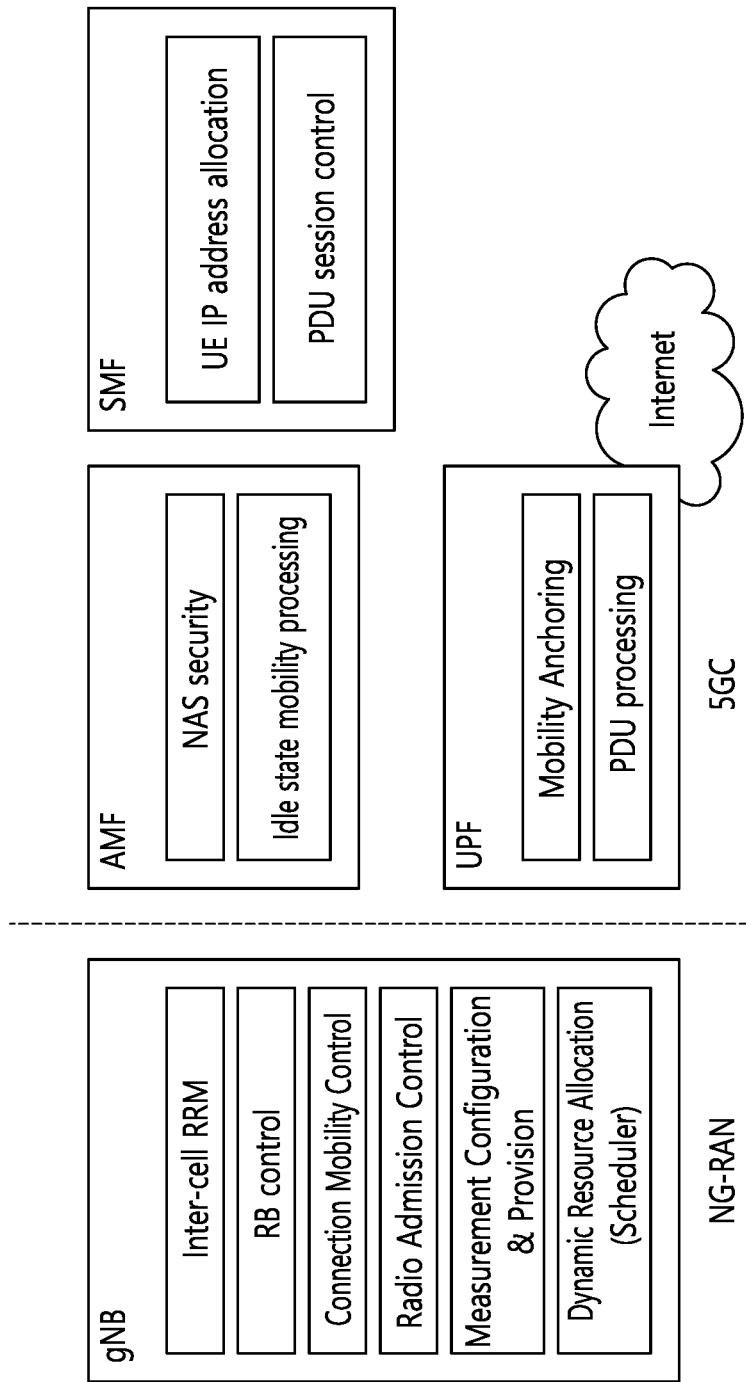
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
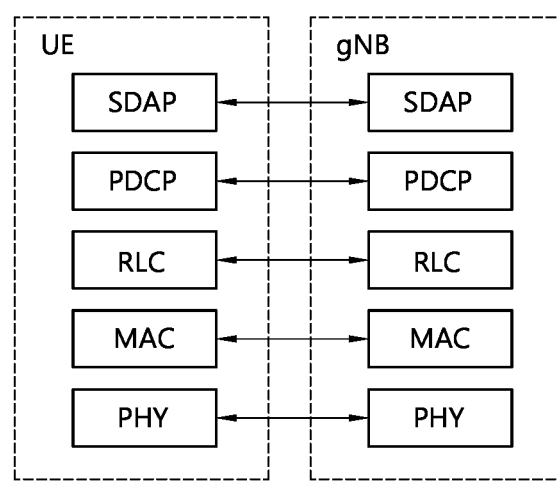
FIGS. 4A and 4B show a radio protocol architecture, based on an embodiment of the present disclosure.
Figure 4B:
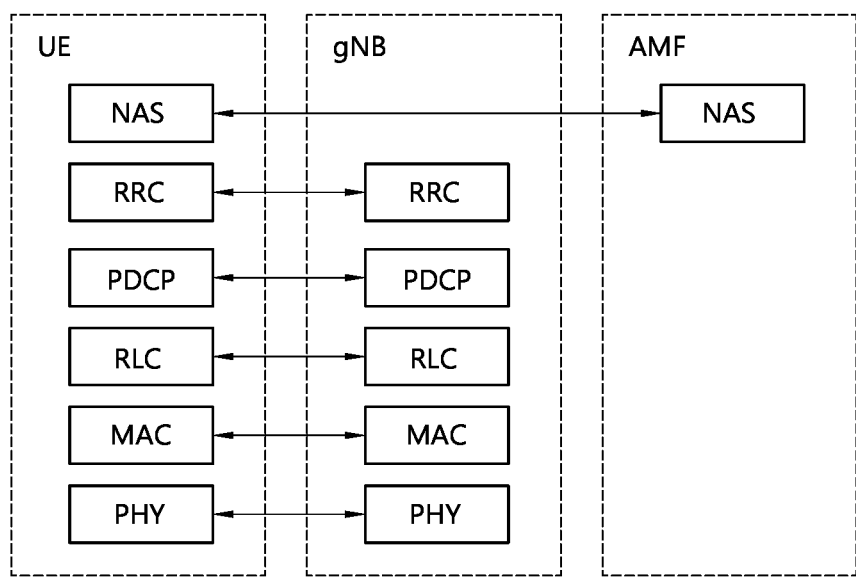

FIGS. 4A and 4B show a radio protocol architecture, based on an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
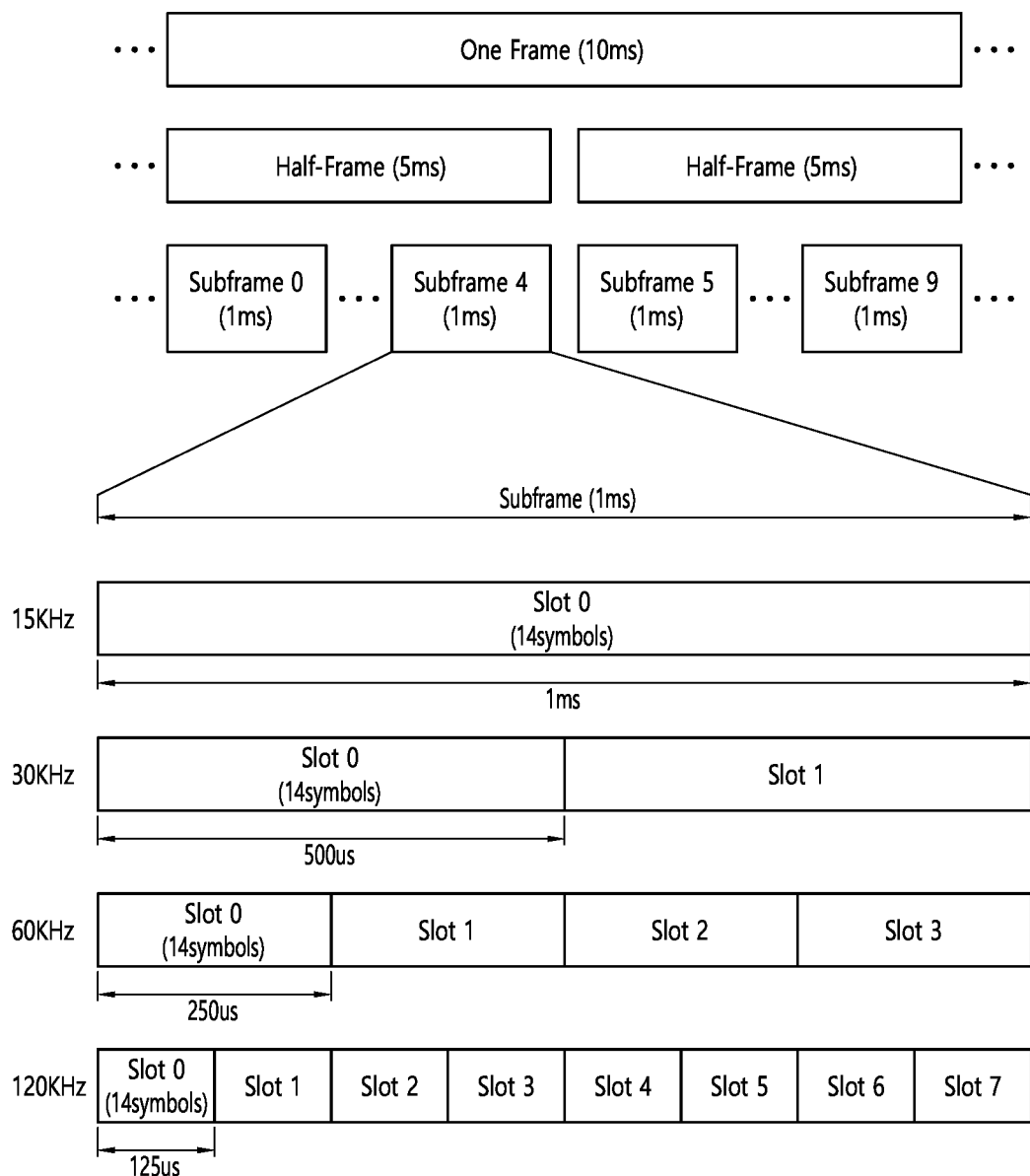
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15 * 2^u$) | $N_{symb}^{slot}$ | $N_{slot}^{frame, u}$ | $N_{slot}^{subframe, u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15 * 2^u$) | $N_{symb}^{slot}$ | $N_{slot}^{frame, u}$ | $N_{slot}^{subframe, u}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
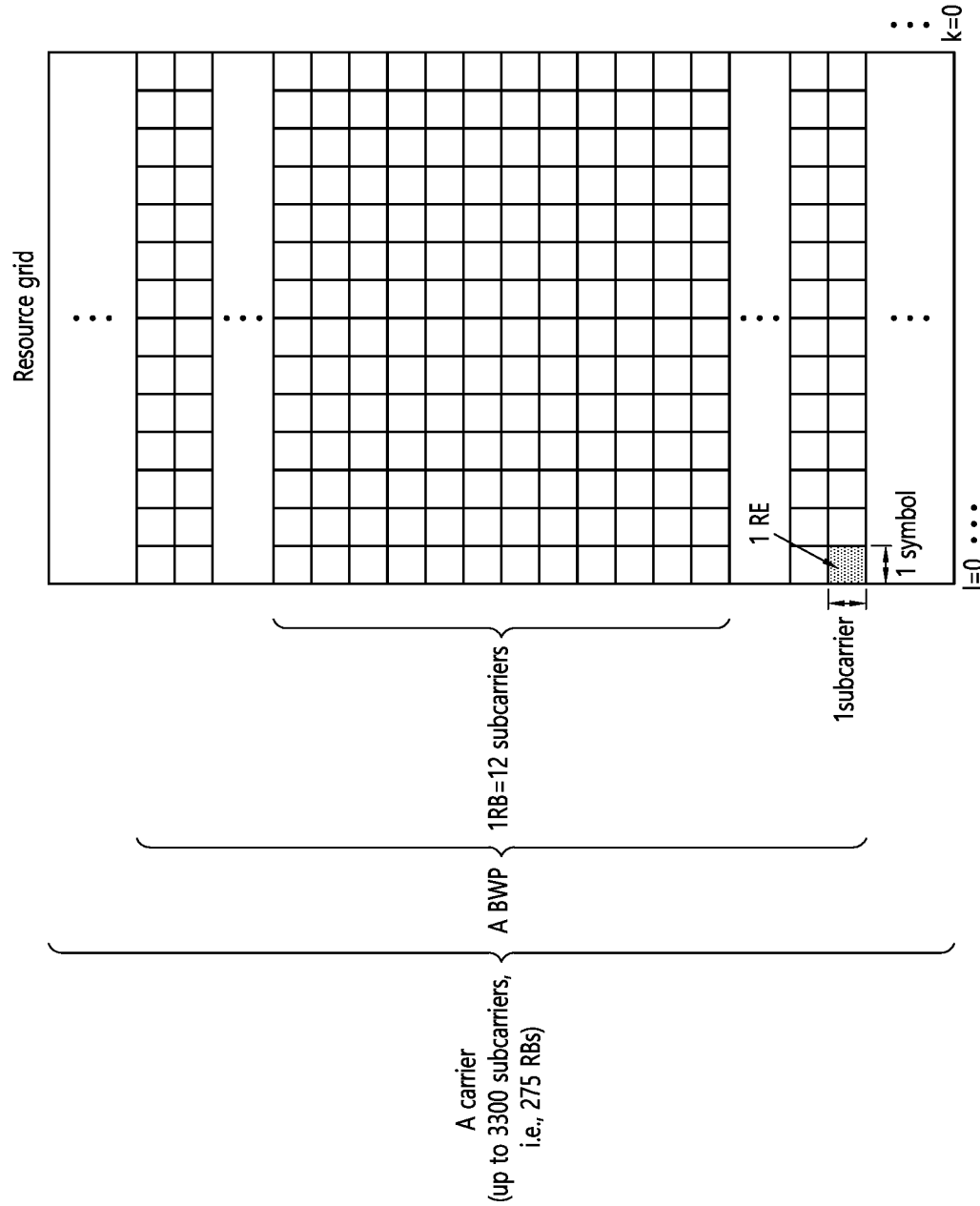
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P) RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
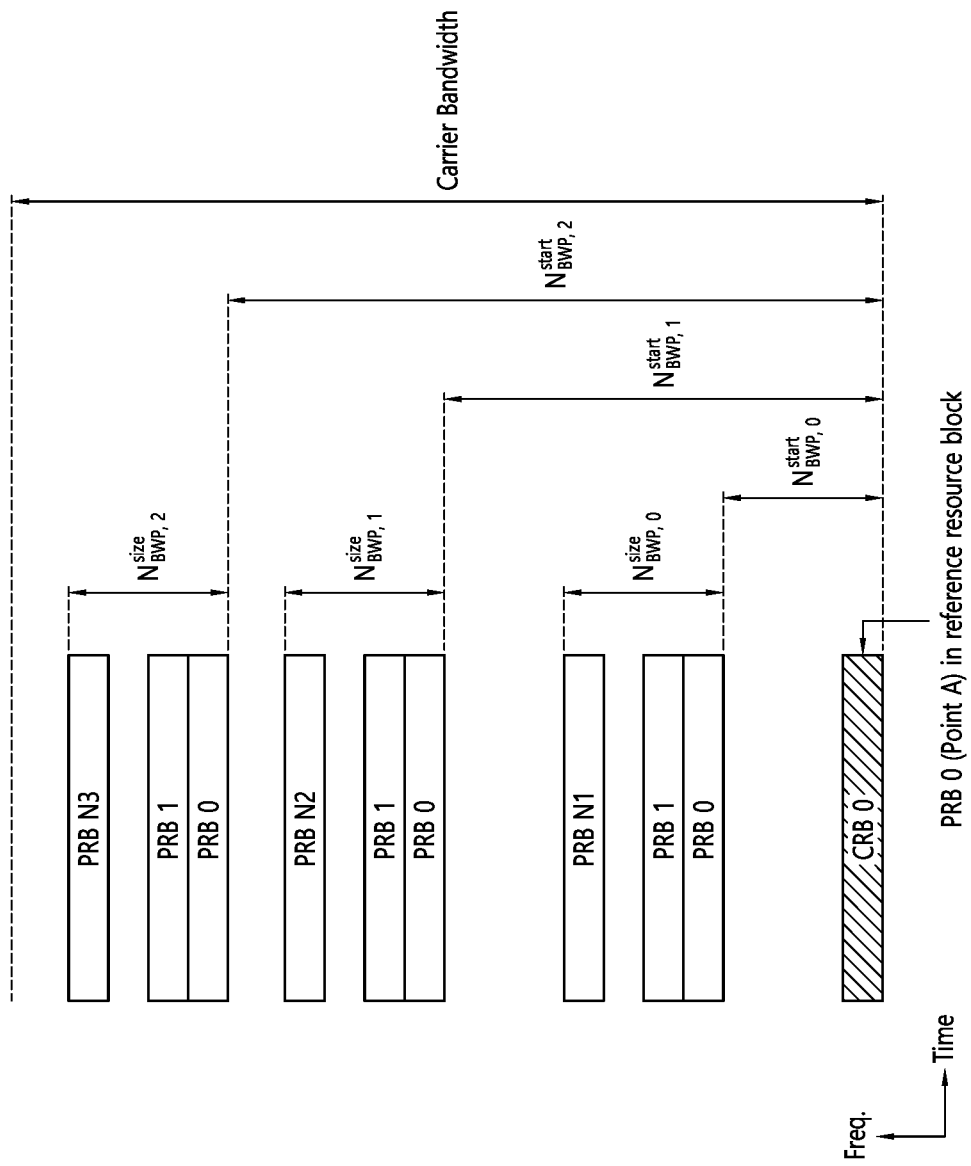
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
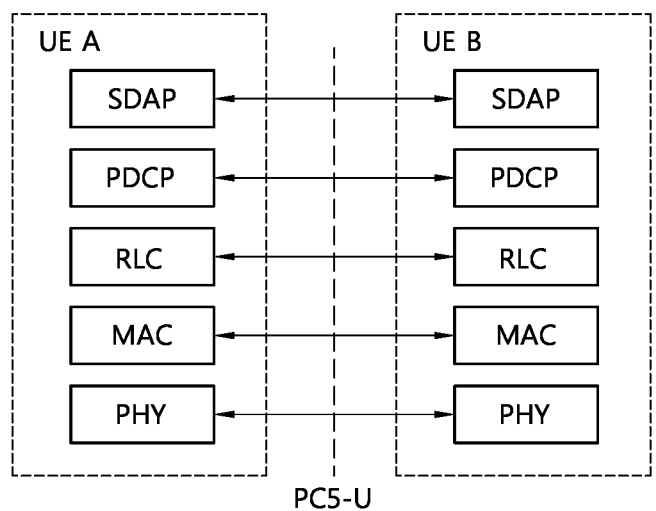
FIGS. 8A and 8B show a radio protocol architecture for a SL communication, based on an embodiment of the present disclosure.
Figure 8B:
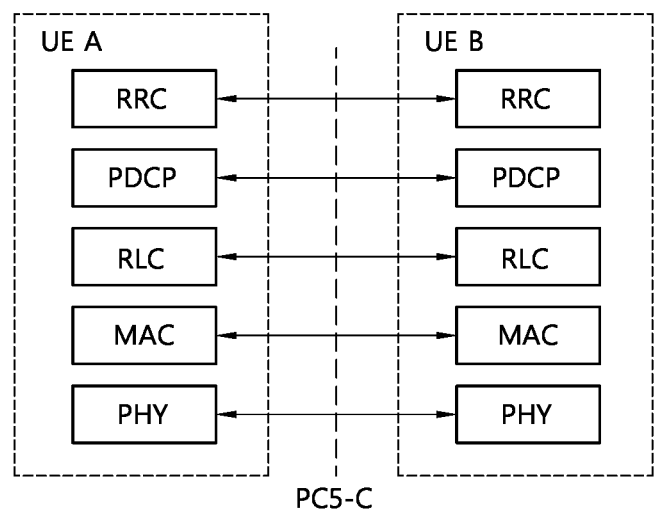

FIGS. 8A and 8B show a radio protocol architecture for a SL communication, based on an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
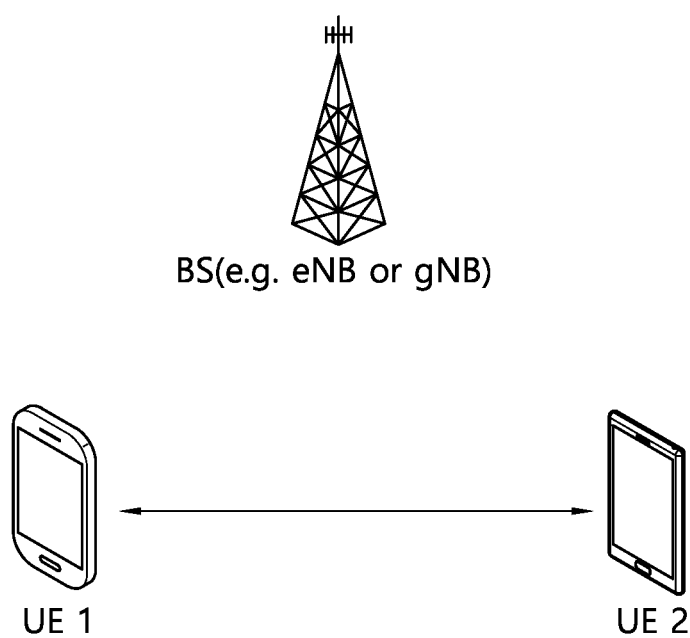
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
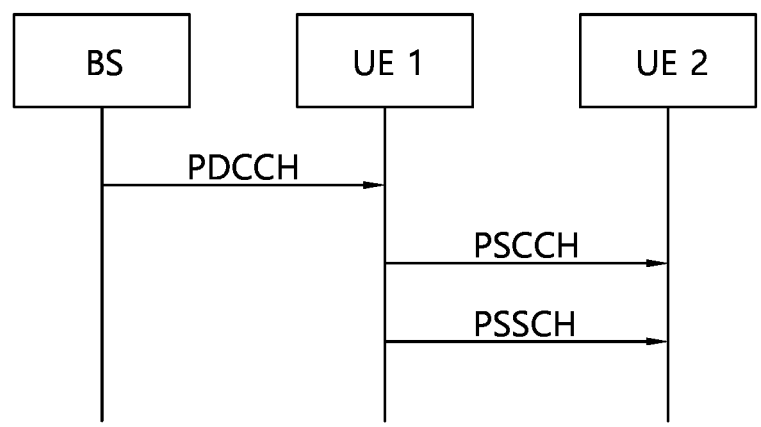
FIGS. 10A and 10B show a procedure of performing V2X or SL communication by a UE based on a transmission mode, based on an embodiment of the present disclosure.
Figure 10B:
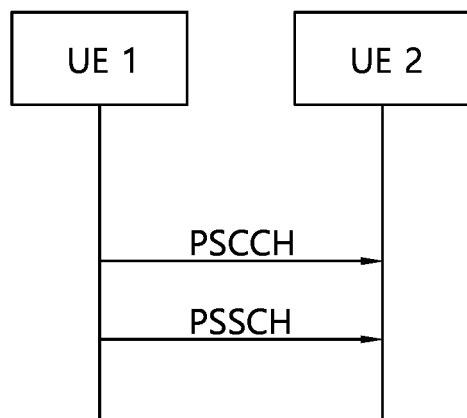

FIGS. 10A and 10B show a procedure of performing V2X or SL communication by a UE based on a transmission mode, based on an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
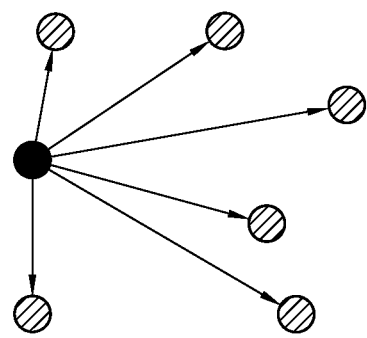
FIGS. 11A to 11C show three cast types, based on an embodiment of the present disclosure.
Figure 11B:
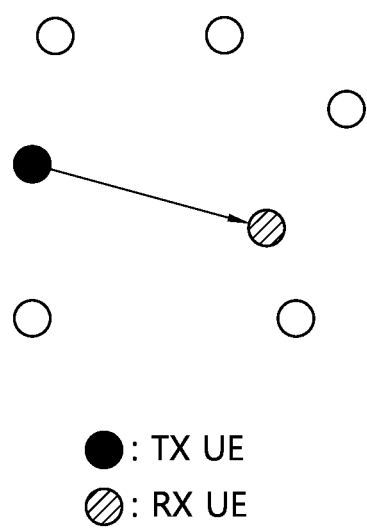
Figure 11C:
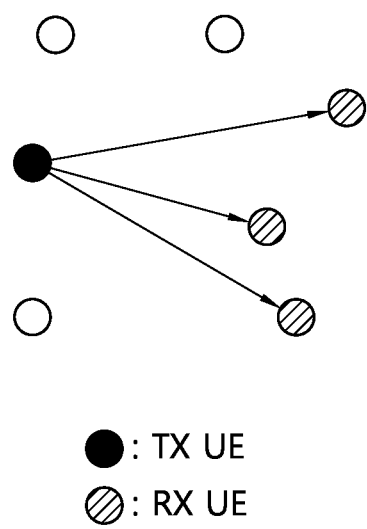

FIGS. 11A to 11C show three cast types, based on an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in SL communication, a UE needs to efficiently select resource(s) for SL transmission. Hereinafter, based on various embodiments of the present disclosure, a method for a UE to efficiently select resource(s) for SL transmission and an apparatus supporting the same will be described. In various embodiments of the present disclosure, SL communication may include V2X communication.

At least one of the methods that are proposed based on the various embodiments of the present disclosure may be applied to at least one of unicast communication, groupcast communication, and/or broadcast communication.

At least one of the methods that are proposed based on the various embodiments of the present disclosure may be applied not only to PC5 interface or SL interface (e.g., PSCCH, PSSCH, PSBCH, PSSS/SSSS, and so on) based SL communication or V2X communication but also to Uu interface (e.g., PUSCH, PDSCH, PDCCH, PUCCH, and so on) based SL communication or V2X communication.

In the various embodiments of the present disclosure, receiving operation(s) of the UE may include decoding operation(s) and/or receiving operation(s) of SL channel(s) and/or SL signal(s) (e.g., PSCCH, PSSCH, PSFCH, PSBCH, PSSS/SSSS, and so on). Receiving operation(s) of the UE may include decoding operation(s) and/or receiving operation(s) of WAN DL channel(s) and/or WAN DL signal(s) (e.g., PDCCH, PDSCH, PSS/SSS, and so on). Receiving operation(s) of the UE may include sensing operation(s) and/or channel busy ratio (CBR) measuring operation(s). In the various embodiments of the present disclosure, sensing operation(s) of the UE may include PSSCH-RSRP measuring operation(s) based on PSSCH DM-RS sequence(s), PSSCH-RSRP measuring operation(s) based on PSSCH DM-RS sequence(s), which is scheduled by a PSCCH that is successfully decoded by the UE, sidelink RSSI (S-RSSI) measuring operation(s), and/or S-RSSI measuring operation(s) based on subchannel(s) related to V2X resource pool(s). In the various embodiments of the present disclosure, transmitting operation(s) of the UE may include transmitting operation(s) of SL channel(s) and/or SL signal(s) (e.g., PSCCH, PSSCH, PSFCH, PSBCH, PSSS/SSSS, and so on). Transmitting operation(s) may include transmitting operation(s) of WAN UL channel(s) and/or WAN UL signal(s) (e.g., PUSCH, PUCCH, SRS, and so on). In the various embodiments of the present disclosure, a synchronization signal may include an SLSS and/or a PSBCH.

In the various embodiments of the present disclosure, configuration may include signaling, signaling from a network, configuration from a network, and/or a pre-configuration from a network. In the various embodiments of the present disclosure, definition may include signaling, signaling from a network, configuration from a network, and/or a pre-configuration from a network. In the various embodiments of the present disclosure, designation may include signaling, signaling from a network, configuration from a network, and/or a pre-configuration from a network.

example, a carrier may include one or more BWPs. For example, a BWP may include one or more resource pools.

Meanwhile, NR sidelink supports CSI measurement/reporting between two UEs, and CSI measurement/reporting may be used for link adaptation between two UEs. For example, a UE2 which has received CSI-RS(s) from a UE1 may appropriately adjust Modulation and Coding Scheme (MCS) or select an appropriate precoding matrix by using channel state (e.g., a value related to the channel state) estimated based on the CSI-RS(s).

Meanwhile, in order to support CSI measurement/reporting in NR sidelink, agreements as shown in Table 5 were derived with respect to the sidelink CSI report in a recent 3GPP RAN2 conference.

TABLE 5

| Agreements on CSI report(RAN2#108): |
|---|
| Reporting SL CSI via MAC CE (with one OCTET) identified by new LCID. |
| RAN2 assumes 1-bit RI and a single 4-bits for CQI based on Uu and will ask RAN1 if ok. |
| CSI reporting MAC CE report is triggered by indication from lower layer. |
| CSI report event shall be cancelled if the CSI report has been transmitted. CSI report is one-shot transmission. |
| For mode1 if there is no configured SL-resource, a SL CQI/RI reporting MAC CE may trigger SR and be mapped to zero or one SR configuration. For mode2 if there is no configured SL-resource, the UE will perform resource selection for SL CQI/RI reporting. (Working assumption) |
| Fixed priority for SL MAC CE. |
|    Prioritization rule for data can be reused for this SL MAC CE. |
| TX UE provides SL measurement configuration via PC5-RRC signalling to Rx UE. |
| Rx UE should be able to report the SL-RSRP to Tx UE via PC5-RRC signalling. It is not necessary to notify the gNB of the SL-RSRP measurement result. |
| Both event triggered and periodical sidelink RSRP measurement report could be supported. |
| For the event triggered report, at least the Event A1 (SL-RSRP exceeds a threshold) or the Event A2 (SL-RSRP is lower than a threshold) shall be supported. |
| CSI report MAC CE can only be multiplexed with transmissions for the same unicast link (e.g. having same source and destination L2 IDs) |
|    CSI report MAC CE is prioritized between PC5-RRC/S and SL data LCHs in SL LCP. |

In the various embodiments of the present disclosure, ProSe Per Packet Priority (PPPP) may be replaced with ProSe Per Packet Reliability (PPPR), and PPPR may be replaced with PPPP. For example, as the PPPP value becomes smaller, this may indicate a high priority, and, as the PPPP value becomes greater, this may indicate a low priority. For example, as the PPPR value becomes smaller, this may indicate a high reliability, and, as the PPPR value becomes greater, this may indicate a low reliability. For example, a PPPP value related to a service, a packet or a message being related to a high priority may be smaller than a PPPP value related to a service, a packet or a message being related to a low priority. For example, a PPPR value related to a service, a packet or a message being related to a high reliability may be smaller than a PPPR value related to a service, a packet or a message being related to a low reliability.

In the various embodiments of the present disclosure, a session may include at least one of a unicast session (e.g., a unicast session for SL), a groupcast/multicast session (e.g., a groupcast/multicast session for SL), and/or a broadcast session (e.g., a broadcast session for SL).

In the various embodiments of the present disclosure, a carrier may be replaced with at least one of a BWP and/or a resource pool, or vice versa. For example, a carrier may include at least one of a BWP and/or a resource pool. For Referring to Table 5, in sidelink communication, a UE may report SL CSI to another UE through a MAC CE. That is, in communication between a base station and a UE, the UE reports CSI to the base station through L1 signaling (e.g., physical layer signaling), whereas in sidelink communication, the UE may report SL CSI to another UE through the MAC CE. Accordingly, if the SL MAC CE is defined together with a new logical channel ID (LCID), and if there is no appropriate resource for transmitting the SL MAC CE, the UE may trigger mode 1 resource scheduling (e.g., transmit SR to a base station), or the UE may perform mode 2 resource scheduling (e.g., sensing-based resource selection). For convenience of description, CSI transmitted/reported through the MAC CE may be referred to as a CSI MAC CE, a sidelink CSI MAC CE, or SL CSI. Meanwhile, the CSI MAC CE should be transmitted within a transmission latency bound of the UE in consideration of situations (e.g., prioritization, congestion control, etc.) related to transmission of the UE. For example, it is assumed that a packet delay budget (PDB) of packet(s) to be transmitted by the UE is 100 ms. In this case, the UE should transmit the CSI MAC CE within at least 100 ms. However, the latency bound of 100 ms is only a transmission latency bound of data to be transmitted by the UE, and the UE may have to transmit the CSI MAC CE within a time faster than 100 ms. For example, the UE may have to transmit the CSI MACE CE within a latency bound of about 3 to 20 ms.

Hereinafter, based on various embodiments of the present disclosure, a method for transmitting a CSI MAC CE and an apparatus supporting the same are proposed. Various embodiments proposed below may be applied to sidelink unicast communication. For convenience of description, although unicast communication is mainly described, various embodiments proposed below may be applied to other cast types (e.g., groupcast or broadcast). For example, if a PC5-RRC connection between UEs is established in groupcast or broadcast, CSI reporting may be performed between UEs. Accordingly, various embodiments proposed below may be applied not only to unicast communication but also to other cast type communication.

As described above, a PDB of SL CSI may have to have a value less than or equal to a PDB of data. More specifically, the PDB of the SL CSI may be less than or equal to the PDB of data to be guaranteed for service(s) between two UEs. Herein, the PDB of data may refer to a specific parameter (e.g., Packet Delay Budget) among QoS information (e.g., standardized PQI information) for communication between two UEs in unicast communication. For example, Table 6 below may show a mapping between standardized PQI and QoS characteristics for sidelink service(s). For details related to Table 6, refer to 3GPP TS 23.287 V16.1.0.

TABLE 6

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 1 | GBR | 3 | 20 ms | $10^{-4}$ | N/A | 2000 ms | Platooning between UEs - Higher degree of automation; Platooning between UE and RSU - Higher degree of automation |
| 2 | (NOTE 1) | 4 | 50 ms | $10^{-2}$ | N/A | 2000 ms | Sensor sharing - higher degree of automation |
| 3 | | 3 | 100 ms | $10^{-4}$ | N/A | 2000 ms | Information sharing for automated driving - between UEs or UE and RSU - higher degree of automation |
| 55 | Non-GBR | 3 | 10 ms | $10^{-4}$ | N/A | N/A | Cooperative lane change - higher degree of automation |
| 56 | | 6 | 20 ms | $10^{-1}$ | N/A | N/A | Platooning informative exchange - low degree of automation; Platooning - information sharing with RSU |
| 57 | | 5 | 25 ms | $10^{-1}$ | N/A | N/A | Cooperative lane change - lower degree of automation |
| 58 | | 4 | 100 ms | $10^{-2}$ | N/A | N/A | Sensor information sharing - lower degree of automation |
| 59 | | 6 | 500 ms | $10^{-1}$ | N/A | N/A | Platooning - reporting to an RSU |
| 82 | Delay Critical GBR | 3 | 10 ms | $10^{-4}$ | 2000 bytes | 2000 ms | Cooperative collision avoidance; Sensor sharing - Higher degree of automation; Video sharing - higher degree of automation |
| 83 | (NOTE 1) | 2 | 3 ms | $10^{-5}$ | 2000 byte | 2000 ms | Emergency trajectory alignment; Sensor sharing - Higher degree of automation |

(NOTE 1):
GBR and Delay Critical GBR PQIs can only be used for unicast PC5 communications. Editor's note: It is FFS if GBR and Delay Critical GBR can also be used for broadcast and groupcast.

For example, referring to Table 6, PQI value 1 supports platooning service, and should satisfy QoS characteristics such as priority level 3, PDB 20 ms, Packet Error Rate (PER) $10^{-4}$, etc. The QoS characteristics may be mapped to each radio bearer (RB). For example, if a PQI value related to a specific radio bearer (RB) is 1, data transmitted/received on the specific RB should be transmitted/received to satisfy the QoS characteristics corresponding to the PQI value 1 of Table 6.

However, the PDB of the SL CSI may be independent and may have a value less than or equal to the PDB indicated by the PQI value. For example, assuming that a PQI value mapped to an RB is 3, a PDB mapped to the PQI value 3 may be 100 ms. However, if a UE1 transmits SL CSI to a UE2 within 100 ms which is the PDB of data, accuracy of channel estimation of the UE2 based on the SL CSI may be deteriorated. Therefore, even though the PDB of data is 100 ms, the UE1 may have to transmit the SL CSI to the UE2 within the earlier delay budget.

On the other hand, in the case of the PDB of the SL CSI, the UE may follow a PDB indicated by an LCH (or RB) related to data. In this case, if a MAC PDU is generated from multiple LCHs (or RBs), the PDB of the CSI may follow the minimum PDB value among them. For example, if a MAC PDU is generated from two LCHs and a CSI MAC CE is multiplexed into the MAC PDU, the PDB of the CSI MAC CE follows the minimum PDB value among the two LCHs.

As described above, in sidelink communication, both UEs may perform unicast communication. Herein, in unicast communication, a path for transmitting and receiving a specific service between UEs may be referred to as a session. For example, establishment of a session between two UEs means that a PC5-RRC connection between the two UEs is successfully established, and the two UEs can transmit and receive RRC information through the PC5-RRC connection.

Furthermore, in order for two UEs to transmit and receive multiple services in unicast communication, a plurality of unicast sessions may be established between the two UEs. Then, the two UEs may transmit and receive a PC5-RRC configuration for each session, and the two UEs may configure each session. In this case, each session may have different QoS characteristics.

Figure 12:
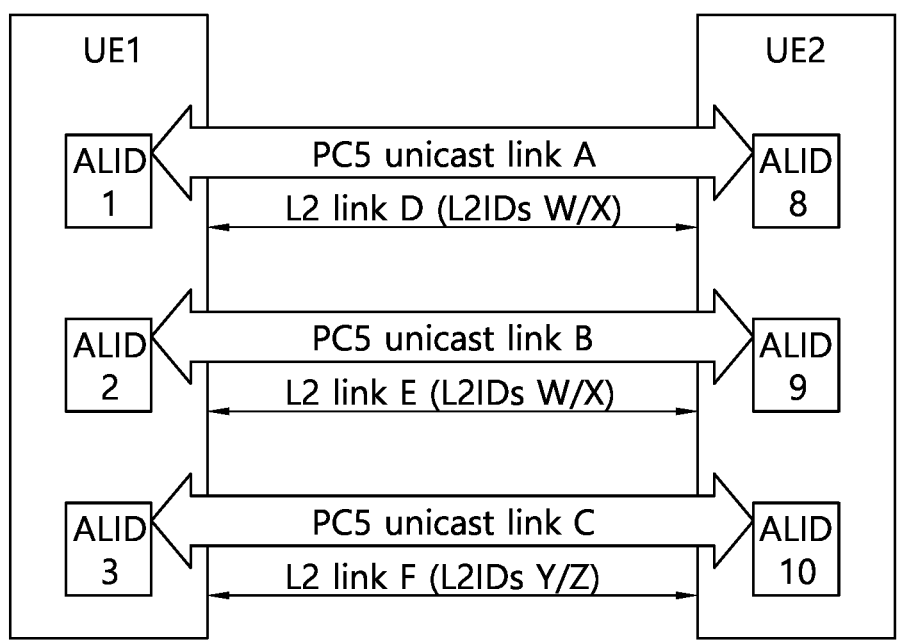
FIG. 12 shows an example of a plurality of unicast links between two UEs.

FIG. 12 shows an example of a plurality of unicast links between two UEs.

Referring to FIG. 12, two UEs may establish three sessions to transmit and receive three services. For example, PC5-RRC connection A, PC5-RRC connection B and PC5-RRC connection C may be established between a UE1 and a UE2.

For example, the UE1 and the UE2 may exchange information such as an RRC configuration, an AS configuration, a UE capability, etc., through each PC5-RRC connection. In addition, the UE1 and the UE2 may exchange different QoS information to be supported for each service. If the link A and the link B have different QoS characteristics in the embodiment of FIG. 12, a PDB related to the link A and a PDB related to the link B may be different from each other. In this situation, the UE may have to determine a PDB of SL CSI.

For example, the PDB of the SL CSI may be configured for the UE to be a fixed value. For example, if the PDB of the SL CSI has a fixed value, the UE may determine the PDB of the SL CSI regardless of the PDB of each link. In addition, the UE may perform resource occupation based on the PDB of the SL CSI. In addition, the UE may transmit the SL CSI by using the occupied resource.

For example, the PDB of the SL CSI may be configured for the UE to be a value related to the PDB of each link. For example, if the PDB of the SL CSI is related to the PDB of each link, the UE may determine the minimum value among PDBs of the plurality of links as the PDB of the SL CSI. For example, if the PDB of the SL CSI is related to the PDB of each link, the UE may determine a value less than the minimum value among PDBs of a plurality of links as the PDB of the SL CSI.

For example, in the embodiment of FIG. 12, it is assumed that a PDB of the link A is 50 ms and a PDB of the link B is 100 ms. In this case, the PDB of the SL CSI to be exchanged between the UE1 and the UE2 may have a value less than or equal to 50 ms. In this way, the PDB of the SL CSI may be related to the PQI mapped to each link or each RB. The UE may determine the PDB of the SL CSI as a value less than or equal to the PDB related to the PQI in consideration of the PQI of service(s) to be transmitted. In addition, the UE may perform resource occupation based on the determined PDB of the SL CSI. In addition, the UE may transmit the SL CSI by using the occupied resource.

Specifically, for example, the UE may perform resource occupation by using the selected PDB of the SL CSI. For example, if the PDB of the SL CSI has a value less than the PDB of the data, the UE operating based on resource allocation mode 2 may set a resource selection window having a shorter latency based on the minimum PDB among the PDB of the data and the PDB of the SL CSI, and the UE may select resource(s) related to sidelink communication within the resource selection window. For example, in the case of the UE operating based on resource allocation mode 1, the UE may transmit QoS information to a base station through sidelinkUEinfomation. In this case, if the PDB of the SL CSI is set to be shorter than the PDB of the data, the UE should additionally transmit information on the PDB of the SL CSI to the base station. To this end, for example, the UE may additionally transmit the PDB of the SL CSI to the base station. Alternatively, the UE may additionally transmit an offset value between the minimum PDB of QoS information for data transmitted to the base station and the PDB of the SL CSI to the base station. Then, the base station may perform appropriate mode 1 resource allocation to the UE in consideration of the QoS information received from the UE.

In terms of resource occupation, more specifically, the UE may have to perform resource occupation or be allocated resource(s), by considering a PDB of a PQI related to data accumulated in each logical channel (LCH). For example, in the case of resource allocation mode 2, the UE may set a resource selection window suitable for the PDB and select resource(s) within the resource selection window. In this case, if the UE generates one MAC PDU from a plurality of LCHs, a PDB of the MAC PDU may be the minimum PDB value among PDBs related to each LCH. Herein, for example, if data from an LCH1 (e.g., SDU 1) and data from an LCH2 (e.g., SDU2) are multiplexed, the minimum PDB value may be the minimum value among PDB values related to each LCH. For example, if data from an LCH1 (e.g., SDU1) and a MAC CE (e.g., CSI MAC CE) are multiplexed, the minimum PDB value may be the minimum value among a PDB value related to the LCH1 and a PDB value related to the MAC CE. For example, if a MAC CE1 and a MAC CE2 are multiplexed, the minimum PDB value may be the minimum value among PDB values related to each MAC CE.

In addition, a high frequency band has severe channel variation due to radio characteristics. That is, the high frequency band has extreme channel frequency selective characteristic compared to a low frequency band. Therefore, since the high frequency band has more channel variation than the low frequency band, a sidelink UE transmitting/receiving a sidelink-related service in the high frequency band should transmit a SL CSI report relatively quickly. Therefore, in the case of the high frequency band, a smaller PDB value of the SL CSI than in the low frequency band may have to be applied. For example, beam transmission and reception such as mmWave may be performed in a sidelink high frequency band. In this case, a beam management process may be required for a TX UE and an RX UE to align their beams with each other. In this case, if the CSI-RS is configured for the UE, the UE may perform channel measurement and reporting by using the configured CSI-RS.

Therefore, based on an embodiment of the present disclosure, the PDB of the SL CSI may be different for each carrier. For example, if the PDB of the CSI MAC CE is fixedly determined, the PDB value of the SL CSI may be configured for each carrier range. For example, the PDB of the SL CSI configured for a carrier of a high frequency range may be smaller than the PDB of the SL CSI configured for a carrier of a low frequency range. For example, if the PDB of the CSI MAC CE is related to QoS mapped to data or an RB, a UE performing SL communication in a high frequency band may set or determine the PDB of the CSI MAC CE to a value smaller by a specific offset than a PDB mapped to data or an RB.

Figure 13:
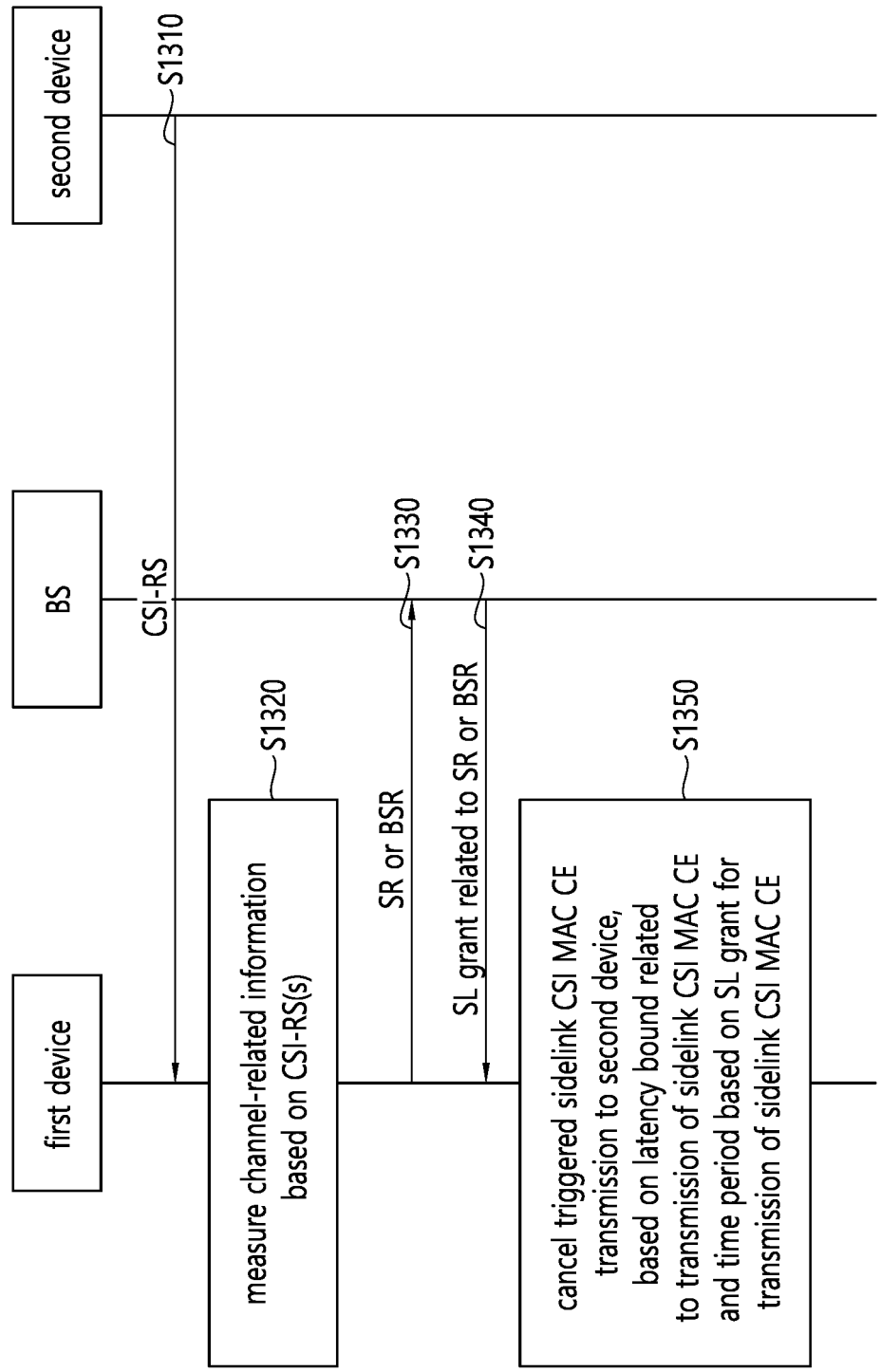
FIG. 13 shows an example of a procedure in which a base station, a first device, and a second device perform sidelink communication related to transmission of a sidelink CSI MAC CE.

FIG. 13 shows an example of a procedure in which a base station, a first device, and a second device perform sidelink communication related to transmission of a sidelink CSI MAC CE.

For example, by triggering CSI reporting, the UE may generate a message to transmit the sidelink CSI MAC CE. For example, an upper layer (e.g., MAC layer) of the UE may generate the message to transmit the sidelink CSI MAC CE. In this case, if there is no SL grant to transmit the sidelink CSI MAC CE, the UE may trigger resource allocation. For example, in the case of a UE operating based on mode 1, the UE may trigger and transmit a scheduling request (SR) and/or a buffer status report (BSR) in order to be allocated new resource(s) from the base station. Then, the base station may transmit SL grant(s) to the UE. Meanwhile, if the UE fails to receive SL grant(s) from the base station, the UE may cancel the triggered sidelink CSI MAC CE. Herein, for example, the failure of the UE to receive SL grant(s) may comprise that the UE receives SL grant(s) which cannot fulfil the minimum PDB determined for the sidelink MAC PDU or the PDB of the sidelink CSI MAC CE from the base station. That is, even if the UE receives SL grant(s) from the base station, if the UE determines/decides that transmission of the data or the sidelink CSI MAC CE based on the SL grant(s) allocated in consideration of a PDB exceeds the PDB, the UE may cancel the pending data or the pending sidelink CSI MAC CE. For example, in this case, the UE may not transmit the data or the sidelink CSI MAC CE. As described above, the reason why the UE cancels the transmission of the sidelink CSI MAC CE is that the up-to-dateness of the CSI information that should be sent quickly is not guaranteed even if the CSI information is transmitted at the next transmission opportunity.

Alternatively, for example, in case a UE performing sensing-based resource selection in the mode 2 operation selects a resource for sidelink CSI MAC CE transmission based on sensing, if the resource overlaps with a resource used by another UE and/or another UE occupies the resource with a higher priority, and/or a SL-RSRP value is higher than a specific threshold, the UE may cancel the selected resource. If the UE cancels the resource and reselects a new resource, the PDB of the data or the sidelink CSI MAC CE previously intended to be transmitted may be exceeded. In this case, the UE may cancel the pending data or the pending sidelink CSI MAC CE.

FIG. 13 shows an example of a procedure in which a base station, a first device, and a second device according to an embodiment perform sidelink communication related to transmission of a sidelink CSI MAC CE, based on the above examples. In step S1310, the first device according to an embodiment may receive Channel State Information-Reference Signal(s) (CSI-RS(s)) from the second device. In step S1320, the first device according to an embodiment may measure channel-related information based on the CSI-RS(s). In step S1330, the first device according to an embodiment may transmit a Scheduling Request (SR) or a Buffer Status Report (BSR) to the base station, based on the triggering of sidelink CSI Medium Access Control (MAC) Control Element (CE) transmission to the second device by the channel-related information measured based on the CSI-RS(s). In step S1340, the first device according to an embodiment may receive a SL grant related to the SR or the BSR from the base station. In step S1350, the first device according to an embodiment may cancel the triggered sidelink CSI MAC CE transmission to the second device, based on a latency bound related to the transmission of the sidelink CSI MAC CE and a time period based on the SL grant for the transmission of the sidelink CSI MAC CE.

Figure 14:
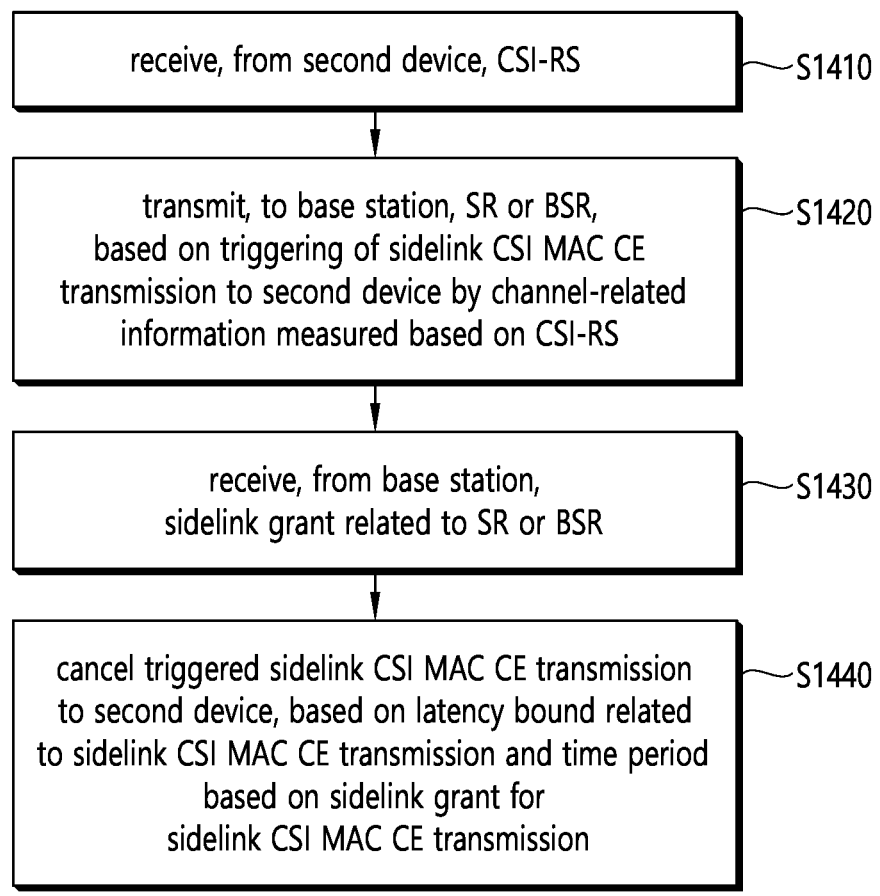
FIG. 14 shows operations of a first device, based on an embodiment of the present disclosure.

FIG. 14 shows operations of a first device, based on an embodiment of the present disclosure.

The operations disclosed in the flowchart of FIG. 14 may be performed in combination with various embodiments of the present disclosure. For example, the operations disclosed in the flowchart of FIG. 14 may be performed based on at least one of devices illustrated in FIGS. 16 to 21. For example, the first device of FIG. 14 may be the first wireless device 100 of FIG. 17 to be described later. In another example, the first device of FIG. 14 may be the second wireless device 200 of FIG. 17 to be described later.

In step S1410, the first device according to an embodiment may receive, from a second device, a channel state information (CSI)-reference signal (RS).

In step S1420, the first device according to an embodiment may transmit, to a base station, a scheduling request (SR) or a buffer status report (BSR), based on triggering of sidelink CSI medium access control (MAC) control element (CE) transmission to the second device by channel-related information measured based on the CSI-RS.

For example, transmitting the SR or the BSR to the base station may comprise: transmitting the SR to the base station; receiving, from the base station, an uplink grant for the BSR related to the SR; and transmitting, to the base station, the BSR based on a resource informed by the uplink grant.

In step S1430, the first device according to an embodiment may receive, from the base station, a sidelink grant related to the SR or the BSR.

In step S1440, the first device according to an embodiment may cancel the triggered sidelink CSI MAC CE transmission to the second device, based on a latency bound related to the sidelink CSI MAC CE transmission and a time period based on the sidelink grant for the sidelink CSI MAC CE transmission.

For example, the latency bound may be replaced with a latency requirement, delay, latency, packet delay budget (PDB), etc.

For example, the triggered sidelink CSI MAC CE transmission to the second device may be canceled, based on the time period based on the sidelink grant for the sidelink CSI MAC CE transmission being located after a time at which the latency bound related to the sidelink CSI MAC CE transmission is expired.

For example, the triggered sidelink CSI MAC CE transmission to the second device may be canceled, based on a start time of the time period based on the sidelink grant for the sidelink CSI MAC CE transmission being located after a time at which the latency bound related to the sidelink CSI MAC CE transmission is expired.

For example, the triggered sidelink CSI MAC CE transmission to the second device may be canceled, based on an end time of the time period based on the sidelink grant for the sidelink CSI MAC CE transmission being located after a time at which the latency bound related to the sidelink CSI MAC CE transmission is expired.

For example, the latency bound related to the sidelink CSI MAC CE transmission may be less than or equal to a minimum latency bound for a sidelink MAC protocol data unit (PDU).

For example, canceling the triggered sidelink CSI MAC CE transmission to the second device may comprise: flushing sidelink CSI MAC CE in a buffer of the first device before transmitting the sidelink CSI MAC CE to the second device.

For example, a first unicast connection and a second unicast connection may be established between the first device and the second device. The latency bound related to the sidelink CSI MAC CE transmission may be determined to be a minimum value among a first unicast latency bound related to the first unicast connection and a second unicast latency bound related to the second unicast connection. In this case, the first unicast latency bound and the second unicast latency bound may be different.

For example, a third unicast latency bound may be set to the latency bound for the sidelink CSI MAC CE transmission based on establishment of a first unicast connection between the first device and the second device. In addition, a fourth unicast latency bound may be set to the latency bound for the sidelink CSI MAC CE transmission based on establishment of a second unicast connection between the first device and the second device. In addition, a fifth unicast latency bound may be set to the latency bound for the sidelink CSI MAC CE transmission based on establishment of the first unicast connection and the second unicast connection between the first device and the second device. In this case, the third unicast latency bound, the fourth unicast latency bound and the fifth unicast latency bound may be the same.

Based on an embodiment of the present disclosure, a first device configured to perform sidelink communication may be provided. The first device may comprise: at least one memory storing instructions; at least one transceiver; and at least one processor connected to the at least one memory and the at least one transceiver. The at least one processor may execute the instructions to: receive, from a second device, a channel state information (CSI)-reference signal (RS); transmit, to a base station, a scheduling request (SR) or a buffer status report (BSR), based on triggering of sidelink CSI medium access control (MAC) control element (CE) transmission to the second device by channel-related information measured based on the CSI-RS; receive, from the base station, a sidelink grant related to the SR or the BSR; and cancel the triggered sidelink CSI MAC CE transmission to the second device, based on a latency bound related to the sidelink CSI MAC CE transmission and a time period based on the sidelink grant for the sidelink CSI MAC CE transmission.

Based on an embodiment of the present disclosure, an apparatus (or chip (set)) configured to control a first user equipment (UE) may be provided. The apparatus may comprise: at least one processor; and at least one memory connected to the at least one processor and storing instructions. The at least one processor may execute the instructions to: receive, from a second UE, a channel state information (CSI)-reference signal (RS); transmit, to a base station, a scheduling request (SR) or a buffer status report (BSR), based on triggering of sidelink CSI medium access control (MAC) control element (CE) transmission to the second UE by channel-related information measured based on the CSI-RS; receive, from the base station, a sidelink grant related to the SR or the BSR; and cancel the triggered sidelink CSI MAC CE transmission to the second UE, based on a latency bound related to the sidelink CSI MAC CE transmission and a time period based on the sidelink grant for the sidelink CSI MAC CE transmission.

For example, the first UE of the embodiment may refer to the first device described in the present disclosure. For example, each of the at least one processor and the at least one memory in the apparatus configured to control the first UE may be implemented as a separate sub-chip, or at least two or more components may be implemented through one sub-chip.

Based on an embodiment of the present disclosure, a non-transitory computer-readable storage medium storing instructions may be provided. The instructions, when executed, may cause a first device to: receive, from a second device, a channel state information (CSI)-reference signal (RS); transmit, to a base station, a scheduling request (SR) or a buffer status report (BSR), based on triggering of sidelink CSI medium access control (MAC) control element (CE) transmission to the second device by channel-related information measured based on the CSI-RS; receive, from the base station, a sidelink grant related to the SR or the BSR; and cancel the triggered sidelink CSI MAC CE transmission to the second device, based on a latency bound related to the sidelink CSI MAC CE transmission and a time period based on the sidelink grant for the sidelink CSI MAC CE transmission.

Figure 15:
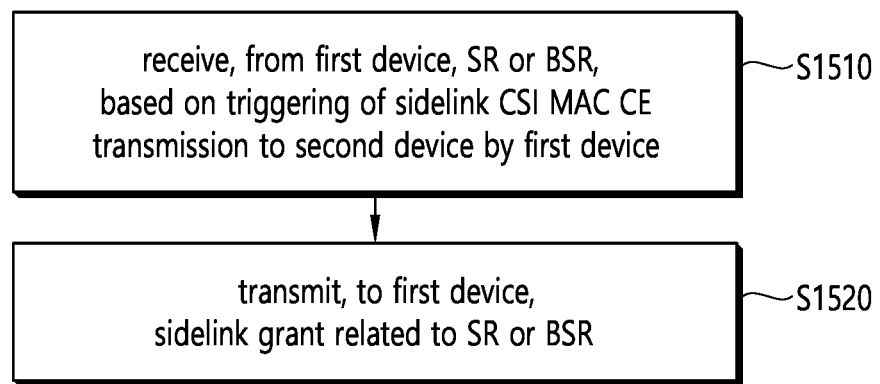
FIG. 15 shows operations of a base station, based on an embodiment of the present disclosure.

FIG. 15 shows operations of a second device, based on an embodiment of the present disclosure.

The operations disclosed in the flowchart of FIG. 15 may be performed in combination with various embodiments of the present disclosure. For example, the operations disclosed in the flowchart of FIG. 15 may be performed based on at least one of devices illustrated in FIGS. 16 to 21. For example, the second device of FIG. 15 may be the second wireless device 200 of FIG. 17 to be described later. In another example, the second device of FIG. 15 may be the first wireless device 100 of FIG. 17 to be described later.

In step S1510, the base station according to an embodiment may receive, from a first device, a scheduling request (SR) or a buffer status report (BSR), based on triggering of sidelink channel state information (CSI) medium access control (MAC) control element (CE) transmission to a second device by the first device.

In step S1520, the base station according to an embodiment may transmit, to the first device, a sidelink grant related to the SR or the BSR.

For example, the sidelink CSI MAC CE transmission to the second device may be triggered by the first device based on channel-related information measured based on a CSI-reference signal (RS) received by the first device from the second device, and For example, based on a latency bound related to the sidelink CSI MAC CE transmission and a time period based on the sidelink grant for the sidelink CSI MAC CE transmission, the triggered sidelink CSI MAC CE transmission to the second device may be canceled by the first device.

For example, the triggered sidelink CSI MAC CE transmission to the second device may be canceled, based on the time period based on the sidelink grant for the sidelink CSI MAC CE transmission being located after a time at which the latency bound related to the sidelink CSI MAC CE transmission is expired.

For example, the triggered sidelink CSI MAC CE transmission to the second device may be canceled, based on a start time of the time period based on the sidelink grant for the sidelink CSI MAC CE transmission being located after a time at which the latency bound related to the sidelink CSI MAC CE transmission is expired.

For example, the triggered sidelink CSI MAC CE transmission to the second device may be canceled, based on an end time of the time period based on the sidelink grant for the sidelink CSI MAC CE transmission being located after a time at which the latency bound related to the sidelink CSI MAC CE transmission is expired.

For example, the latency bound related to the sidelink CSI MAC CE transmission may be less than or equal to a minimum latency bound for a sidelink MAC protocol data unit (PDU).

For example, canceling the triggered sidelink CSI MAC CE transmission to the second device may comprise: flushing sidelink CSI MAC CE in a buffer of the first device before transmitting the sidelink CSI MAC CE to the second device.

For example, a first unicast connection and a second unicast connection may be established between the first device and the second device. The latency bound related to the sidelink CSI MAC CE transmission may be determined to be a minimum value among a first unicast latency bound related to the first unicast connection and a second unicast latency bound related to the second unicast connection. In this case, the first unicast latency bound and the second unicast latency bound may be different.

For example, a third unicast latency bound may be set to the latency bound for the sidelink CSI MAC CE transmission based on establishment of a first unicast connection between the first device and the second device. In addition, a fourth unicast latency bound may be set to the latency bound for the sidelink CSI MAC CE transmission based on establishment of a second unicast connection between the first device and the second device. In addition, a fifth unicast latency bound may be set to the latency bound for the sidelink CSI MAC CE transmission based on establishment of the first unicast connection and the second unicast connection between the first device and the second device. In this case, the third unicast latency bound, the fourth unicast latency bound and the fifth unicast latency bound may be the same.

Based on an embodiment of the present disclosure, a base station configured to perform wireless communication may be provided. The base station may comprise: at least one memory storing instructions; at least one transceiver; and at least one processor connected to the at least one memory and the at least one transceiver. The at least one processor may execute the instructions to: receive, from a first device, a scheduling request (SR) or a buffer status report (BSR), based on triggering of sidelink channel state information (CSI) medium access control (MAC) control element (CE) transmission to a second device by the first device; and transmit, to the first device, a sidelink grant related to the SR or the BSR, wherein the sidelink CSI MAC CE transmission to the second device is triggered by the first device based on channel-related information measured based on a CSI-reference signal (RS) received by the first device from the second device, and wherein, based on a latency bound related to the sidelink CSI MAC CE transmission and a time period based on the sidelink grant for the sidelink CSI MAC CE transmission, the triggered sidelink CSI MAC CE transmission to the second device is canceled by the first device.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between UEs. In this case, a base station, a relay node, or the like may use the proposed method according to various embodiments of the present disclosure. For example, it may be defined that information on whether to apply the method according to various embodiments of the present disclosure is reported by the base station to the UE or by a transmitting UE to a receiving UE through pre-defined signaling (e.g., physical layer signaling or higher layer signaling). For example, it may be defined that information on a rule according to various embodiments of the present disclosure is reported by the base station to the UE or by a transmitting UE to a receiving UE through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
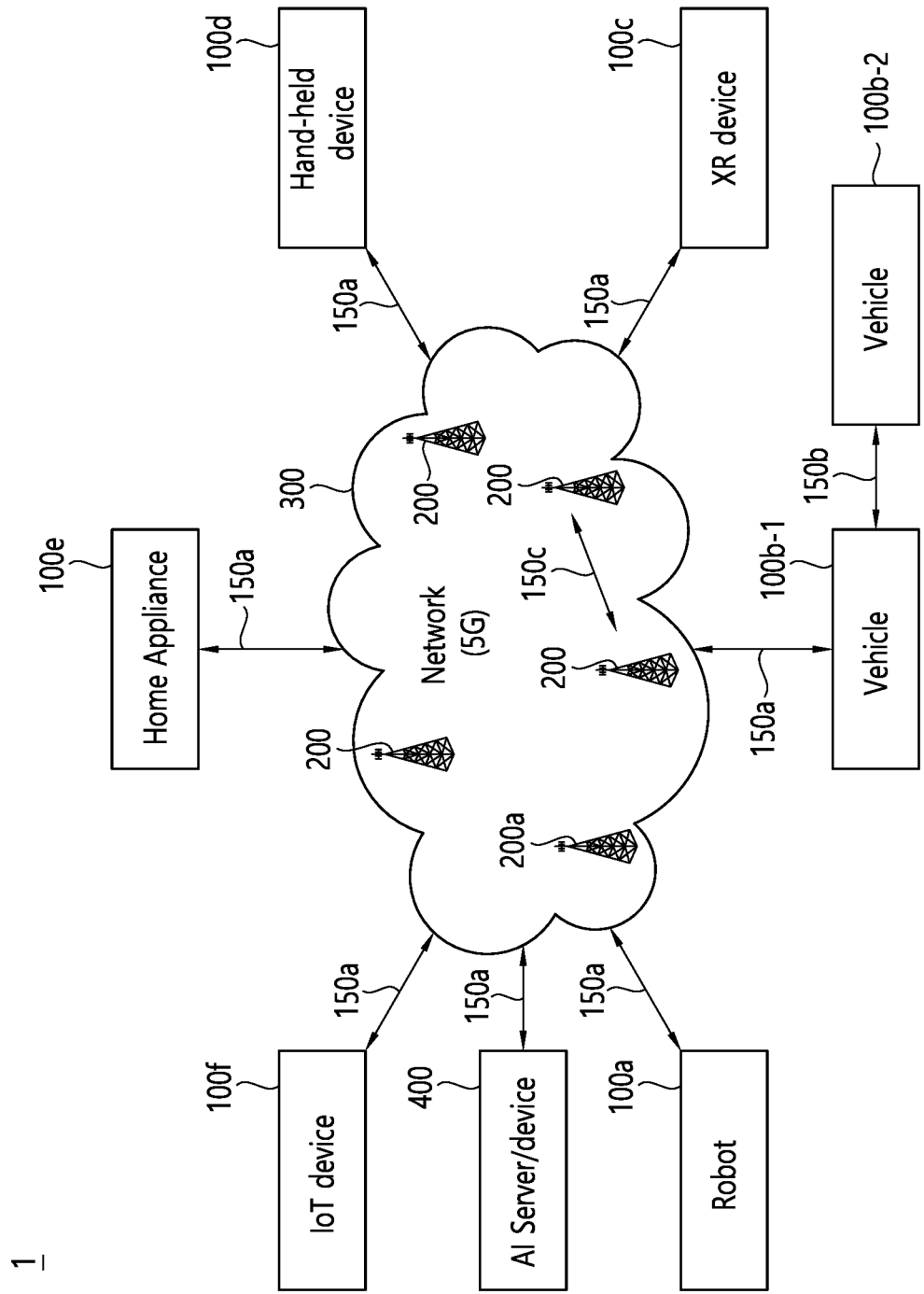
FIG. 16 shows a communication system 1, based on an embodiment of the present disclosure.

FIG. 16 shows a communication system 1, based on an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
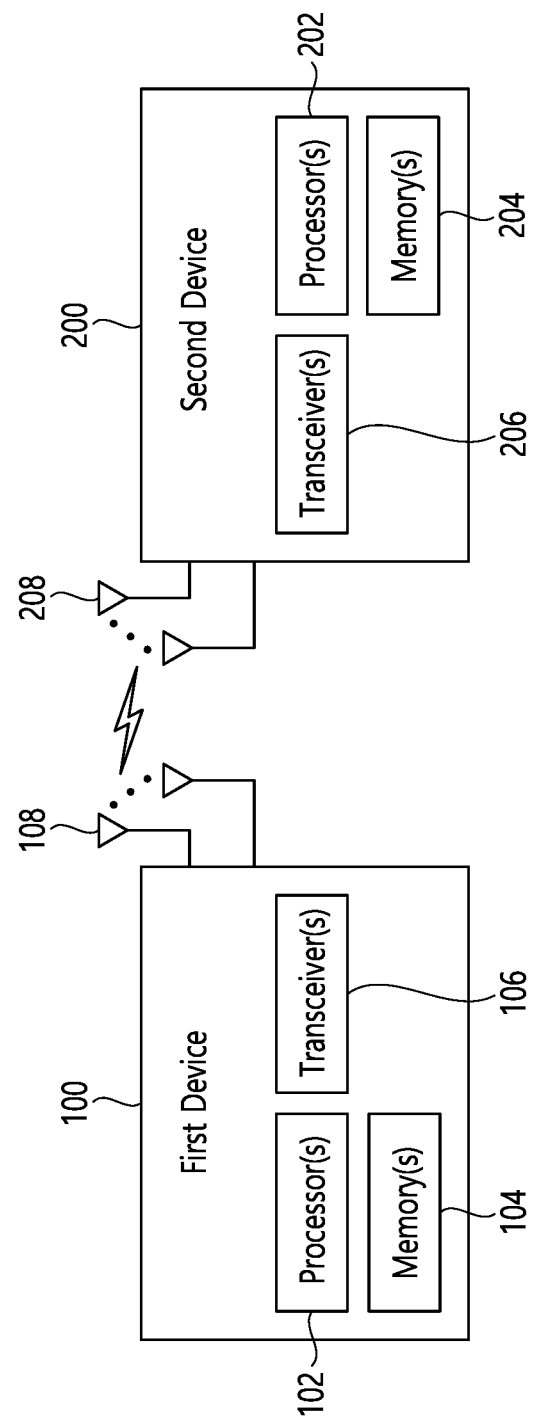
FIG. 17 shows wireless devices, based on an embodiment of the present disclosure.

FIG. 17 shows wireless devices, based on an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
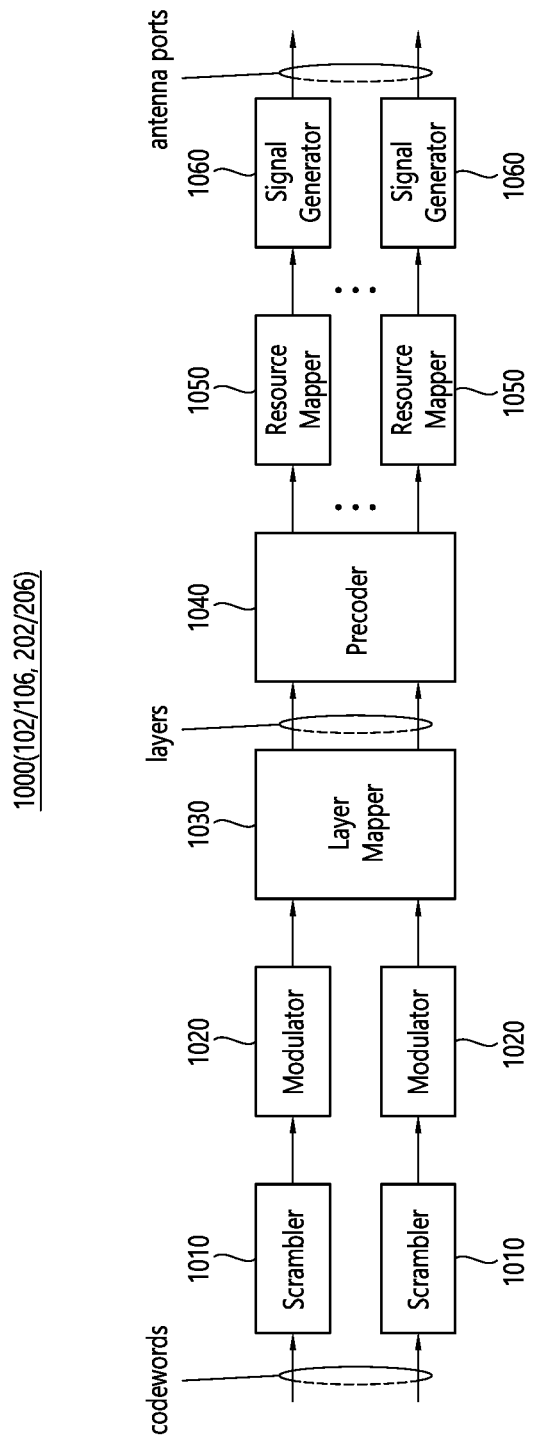
FIG. 18 shows a signal process circuit for a transmission signal, based on an embodiment of the present disclosure.

FIG. 18 shows a signal process circuit for a transmission signal, based on an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
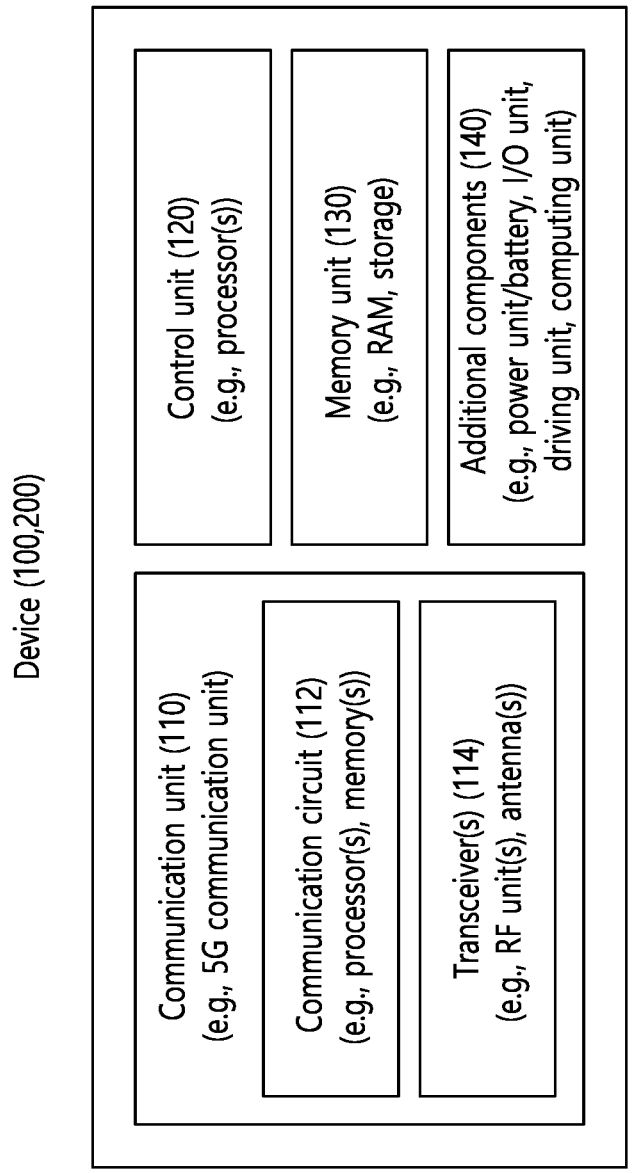
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 16), the vehicles (100*b*-1 and 100*b*-2 of FIG. 16), the XR device (100*c* of FIG. 16), the hand-held device (100*d* of FIG. 16), the home appliance (100*e* of FIG. 16), the IoT device (100*f* of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
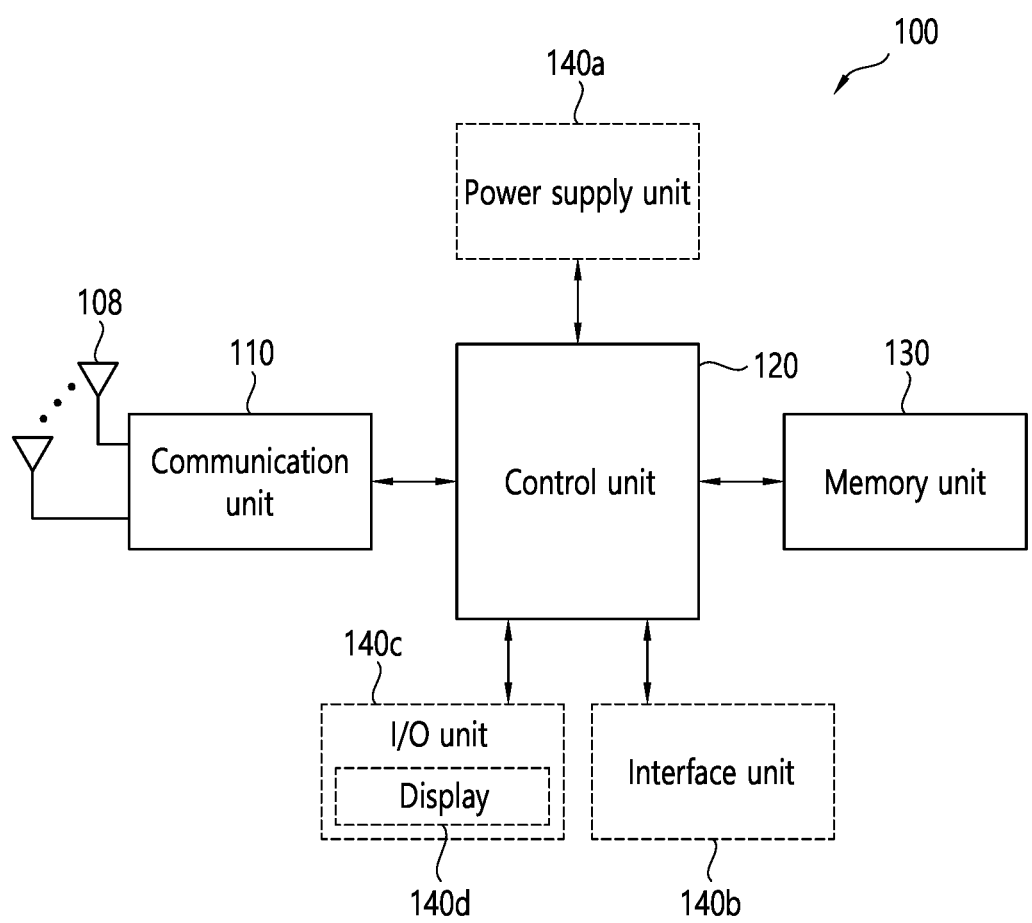
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 21:
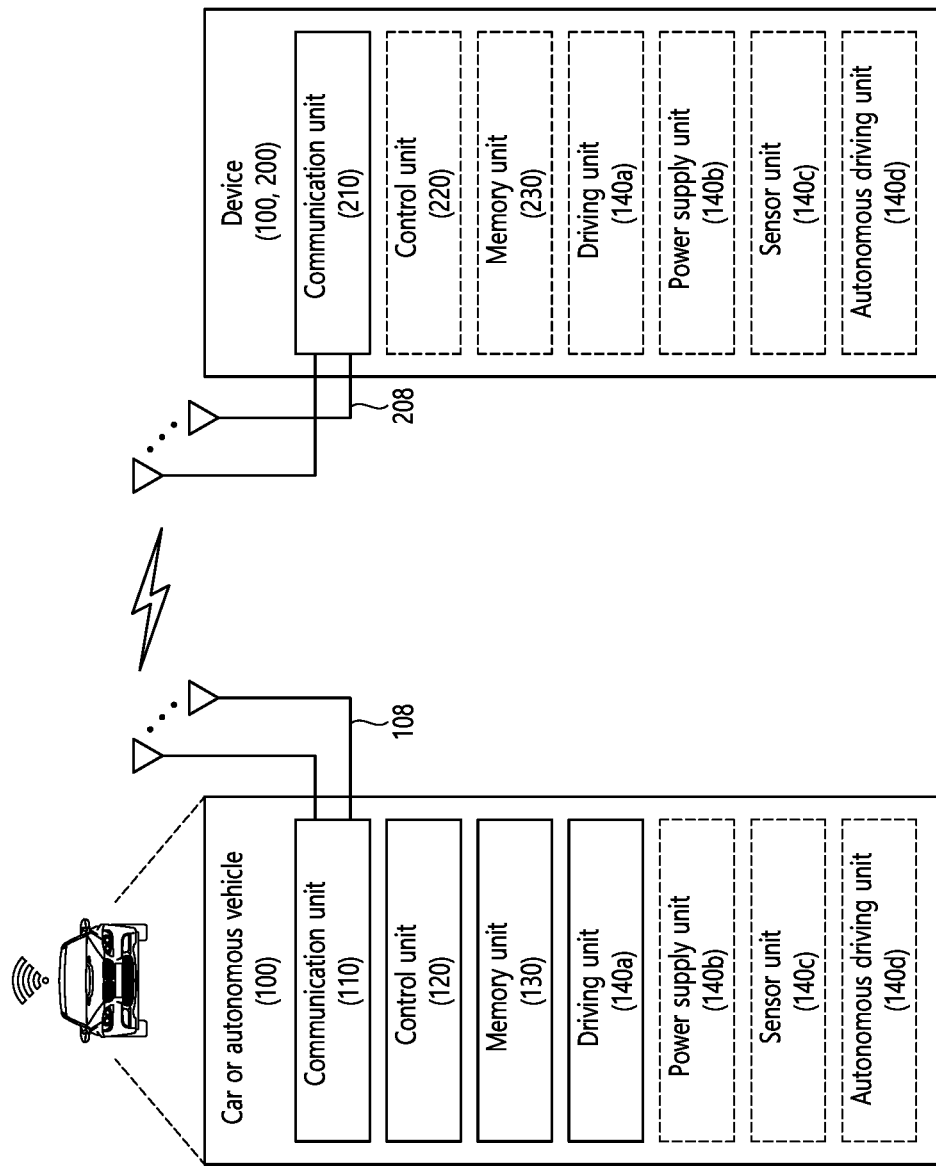
FIG. 21 shows a vehicle or an autonomous vehicle, based on an embodiment of the present disclosure.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing sidelink communication by a first device, the method comprising:
   establishing a plurality of PC5 radio resource control (RRC) connections with a second device;
   receiving, from the second device through the plurality of PC5 RRC connections, information regarding latency bounds for sidelink (SL) channel state information (CSI) reporting, wherein each of the latency bounds is maintained for each of the plurality of PC5 RRC connections;
   triggering SL CSI reporting related to a first PC5 RRC connection among the plurality of PC5 RRC connections;
   receiving, from the second device, a CSI-reference signal (RS) related to the triggered SL CSI reporting;
   determining that transmission of the triggered SL CSI reporting with at least one SL grant cannot fulfil a latency bound for the triggered SL CSI reporting; and
   transmitting, to a base station, a scheduling request (SR) for requesting a resource for the triggered SL CSI reporting, based on the transmission of the triggered SL CSI reporting with the at least one SL grant which cannot fulfil the latency bound for the triggered SL CSI reporting.

2. The method of claim 1, wherein the transmission of the triggered SL CSI reporting with the at least one SL grant which cannot fulfil the latency bound for the triggered SL CSI reporting indicates that no SL grant for transmission of the triggered SL CSI reporting is within the latency bound for the triggered SL CSI reporting.

3. The method of claim 1, wherein the first device is configured with SL resource allocation mode in which the base station schedules an SL communication.

4. The method of claim 1, further comprising:
receiving, from the base station, a SL grant in response to the SR; and
canceling the triggered SL CSI reporting, based on the SL grant which cannot fulfil the latency bound for the triggered SL CSI reporting.

5. The method of claim 4, wherein the triggered SL CSI reporting is canceled based on expiration of the latency bound for the triggered SL CSI reporting.

6. The method of claim 4, wherein canceling the triggered SL CSI reporting comprises: flushing a SL CSI reporting medium access control (MAC) control element (CE) in a buffer of the first device before transmitting the SL CSI reporting MAC CE to the second device.

7. The method of claim 1, further comprising:
generating a SL CSI reporting medium access control (MAC) control element (CE) based on the CSI-RS.

8. The method of claim 1,
wherein the plurality of PC5 RRC connections include the first PC5 RRC connection and a second PC5 RRC connection,
wherein the latency bound related to the SL CSI reporting is determined to be a minimum value for the latency bound related to the first PC5 RRC connection and a latency bound related to the second PC5 RRC connection, and
wherein the latency bound related to the first PC5 RRC connection and the latency bound related to the second PC5 RRC connection are different.

9. A first device configured to perform sidelink communication, the first device comprising:
at least one memory storing instructions;
at least one transceiver; and
at least one processor operatively connected to the at least one memory and the at least one transceiver, wherein the at least one processor executes the instructions to:
establish a plurality of PC5 radio resource control (RRC) connections with a second device;
control the at least one transceiver to receive, from the second device through the plurality of PC5 RRC connections, information regarding latency bounds for sidelink (SL) channel state information (CSI) reporting, wherein each of the latency bounds is maintained for each of the plurality of PC5 RRC connections;
trigger SL CSI reporting related to a first PC5 RRC connection among the plurality of PC5 RRC connections;
control the at least one transceiver to receive, from the second device, a CSI-reference signal (RS) related to the triggered SL CSI reporting;
determine that transmission of the triggered SL CSI reporting with at least one SL grant cannot fulfil a latency bound for the triggered SL CSI reporting; and
control the at least one transceiver to transmit, to a base station, a scheduling request (SR) for requesting a resource for the triggered SL CSI reporting, based on the transmission of the triggered SL CSI reporting with the at least one SL grant which cannot fulfil the latency bound for the triggered SL CSI reporting.

10. The first device of claim 9, wherein the transmission of the triggered SL CSI reporting with the at least one SL grant which cannot fulfil the latency bound for the triggered SL CSI reporting indicates that no SL grant for transmission of the triggered SL CSI reporting is within the latency bound for the triggered SL CSI reporting.

11. The first device of claim 9, wherein the first device is configured with SL resource allocation mode in which the base station schedules an SL communication.

12. The first device of claim 9, wherein the at least one processor further executes the instructions to: control the at least one transceiver to receive, from the base station, a SL grant in response to the SR, and cancel the triggered SL CSI reporting, based on the SL grant which cannot fulfil the latency bound for the triggered SL CSI reporting.

13. An apparatus configured to control a first user equipment (UE), the apparatus comprising:
at least one processor; and
at least one memory operatively connected to the at least one processor and storing instructions, wherein the at least one processor executes the instructions to:
establish a plurality of PC5 radio resource control (RRC) connections with a second device;
receive, from the second device through the plurality of PC5 RRC connections, information regarding latency bounds for sidelink (SL) channel state information (CSI) reporting, wherein each of the latency bounds is maintained for each of the plurality of PC5 RRC connections;
trigger SL CSI reporting related to a first PC5 RRC connection among the plurality of PC5 RRC connections;
receive, from the second UE, a CSI-reference signal (RS) related to the triggered SL CSI reporting;
determine that transmission of the triggered SL CSI reporting with at least one SL grant cannot fulfil a latency bound for the triggered SL CSI reporting; and
transmit, to a base station, a scheduling request (SR) for requesting a resource for the triggered SL CSI reporting, based on the transmission of the triggered SL CSI reporting with the at least one SL grant which cannot fulfil the latency bound for the triggered SL CSI reporting.

14. The apparatus of claim 13, wherein the transmission of the triggered SL CSI reporting with the at least one SL grant which cannot fulfil the latency bound for the triggered SL CSI reporting indicates that no SL grant for transmission of the triggered SL CSI reporting is within the latency bound for the triggered SL CSI reporting.

15. The apparatus of claim 13, wherein the first UE is configured with SL resource allocation mode in which the base station schedules an SL communication.

16. The apparatus of claim 13, wherein the at least one processor further executes the instructions to: receive, from the base station, a SL grant in response to the SR, and cancel the triggered SL CSI reporting, based on the SL grant which cannot fulfil the latency bound for the triggered SL CSI reporting.

17. The apparatus of claim 13,
wherein the plurality of PC5 RRC connections include the first PC5 RRC connection and a second PC5 RRC connection, and
wherein the latency bound related to the first PC5 RRC connection and a latency bound related to the second PC5 RRC connection are same.

* * * * *